(12) United States Patent
Williamson et al.

(10) Patent No.: US 9,587,114 B2
(45) Date of Patent: Mar. 7, 2017

(54) METHODS FOR MAKING LIGNOCELLULOSE COMPOSITE PRODUCTS WITH OXIDATIVE BINDERS AND COMPLEXED METAL CATALYST

(71) Applicant: Georgia-Pacific Chemicals LLC, Atlanta, GA (US)

(72) Inventors: Bobby L. Williamson, Conyers, GA (US); Adam K. Sniady, Liburn, GA (US)

(73) Assignee: Georgia-Pacific Chemicals LLC, Atlanta, GA (US)

(*) Notice: Subject to any disclaimer, the term of this patent is extended or adjusted under 35 U.S.C. 154(b) by 0 days.

(21) Appl. No.: 14/673,865

(22) Filed: Mar. 30, 2015

(65) Prior Publication Data
US 2015/0284567 A1 Oct. 8, 2015

Related U.S. Application Data

(60) Provisional application No. 61/974,308, filed on Apr. 2, 2014.

(51) Int. Cl.
| | | |
|---|---|---|
| *C08L 5/00* | (2006.01) | |
| *C08L 97/02* | (2006.01) | |
| *B27N 1/00* | (2006.01) | |
| *C08L 63/04* | (2006.01) | |
| *C08L 91/08* | (2006.01) | |
| *B27N 3/00* | (2006.01) | |
| *C09J 191/08* | (2006.01) | |
| *C09J 197/02* | (2006.01) | |
| *B27N 1/02* | (2006.01) | |
| *C08L 61/14* | (2006.01) | |

(52) U.S. Cl.
CPC .............. *C08L 97/02* (2013.01); *B27N 1/003* (2013.01); *B27N 3/002* (2013.01); *C08L 63/04* (2013.01); *C08L 91/08* (2013.01); *C09J 191/08* (2013.01); *C09J 197/02* (2013.01); *B27N 1/02* (2013.01); *C08L 61/14* (2013.01)

(58) Field of Classification Search
CPC ... C08L 97/02; B29D 7/01; C08J 5/18; C08H 6/00
See application file for complete search history.

(56) References Cited

U.S. PATENT DOCUMENTS

| | | | |
|---|---|---|---|
| 1,856,567 A | 5/1932 | Kleinert et al. | |
| 2,525,433 A | 10/1950 | Andries | |
| 2,680,113 A | 6/1954 | Erich et al. | |
| 2,690,973 A | 10/1954 | Andries | |
| 2,864,775 A | 12/1958 | Newey | |
| 3,094,515 A | 6/1963 | Keirstead et al. | |
| 3,158,520 A | 11/1964 | Edmonds et al. | |
| 3,280,054 A | 10/1966 | Wolfgang et al. | |
| 3,503,762 A | 3/1970 | Remer | |
| 3,585,104 A | 6/1971 | Kleinert | |
| 3,726,850 A | 4/1973 | Detroit | |
| 3,769,272 A | 10/1973 | Mintz | |
| 3,773,833 A | 11/1973 | Henrici et al. | |
| 3,841,887 A | 10/1974 | Falkehag et al. | |
| 4,017,248 A | 4/1977 | Dieffenbacher et al. | |
| 4,100,016 A | 7/1978 | Diebold et al. | |
| 4,131,564 A | 12/1978 | Dilling | |
| 4,184,845 A | 1/1980 | Lin | |
| 4,186,242 A | 1/1980 | Holmquist | |
| 4,308,203 A | 12/1981 | Lin | |
| 4,355,996 A | 10/1982 | Dilling et al. | |
| 4,470,876 A | 9/1984 | Beaupre et al. | |
| 4,740,591 A | 4/1988 | Dilling et al. | |
| 4,764,596 A | 8/1988 | Lora et al. | |
| 5,337,655 A | 8/1994 | Bielfeldt | |
| 5,611,269 A | 3/1997 | Bielfeldt | |
| 5,670,571 A | 9/1997 | Gabrielson et al. | |
| 5,674,970 A | 10/1997 | Hutchings et al. | |
| 5,739,259 A | 4/1998 | Hutchings et al. | |
| 5,756,642 A | 5/1998 | Hutchings et al. | |
| 5,756,655 A | 5/1998 | Lucas, Jr. et al. | |
| 5,770,750 A | 6/1998 | Hutchings et al. | |
| 5,773,552 A | 6/1998 | Hutchings et al. | |
| 5,837,798 A | 11/1998 | Hutchings et al. | |
| 5,889,137 A | 3/1999 | Hutchings et al. | |
| 5,950,532 A | 9/1999 | Bielfeldt | |
| 6,098,532 A | 8/2000 | Sebastian et al. | |
| 6,166,151 A | 12/2000 | Hariharan et al. | |
| 6,291,077 B1 | 9/2001 | Hariharan et al. | |
| 6,291,558 B1 * | 9/2001 | Raskin et al. | 524/13 |
| 6,399,740 B1 | 6/2002 | Lucas, Jr. et al. | |
| 6,782,810 B2 | 8/2004 | Vilo | |

(Continued)

FOREIGN PATENT DOCUMENTS

| | | |
|---|---|---|
| WO | 9218557 A1 | 10/1992 |
| WO | 9321260 A2 | 10/1993 |
| WO | 9424192 A1 | 10/1994 |
| WO | 2005062800 A2 | 7/2005 |
| WO | 2006031175 A1 | 3/2006 |
| WO | 2011150508 | 12/2011 |

OTHER PUBLICATIONS

International Search Report and Written Opinion for International Application No. PCT/US2015/023440 mailed Jun. 25, 2015.

*Primary Examiner* — Kaj K Olsen
*Assistant Examiner* — Alexander Polyansky
(74) *Attorney, Agent, or Firm* — Ram W. Sabnis

(57) ABSTRACT

In some examples, a method for making a composite product can include combining a plurality of lignocellulose substrates, one or more complexed metal catalysts, one or more complexing agents, and one or more oxidants to produce a lignocellulose binder mixture and heating the lignocellulose binder mixture to produce a composite product. The lignocellulose binder mixture can have a molar ratio of the complexing agent to the complexed metal catalyst of about 0.1 or greater.

20 Claims, No Drawings

(56) References Cited

U.S. PATENT DOCUMENTS

| | | |
|---|---|---|
| 7,176,336 B2 | 2/2007 | Maughon et al. |
| 2003/0186036 A1 | 10/2003 | Goodell et al. |
| 2005/0011621 A1 | 1/2005 | Westermark et al. |
| 2006/0124124 A1 | 6/2006 | Soni et al. |
| 2008/0115899 A1 | 5/2008 | Srebotnik et al. |
| 2008/0280787 A1 | 11/2008 | Rediger et al. |
| 2011/0294991 A1 | 12/2011 | Lake et al. |
| 2013/0213550 A1* | 8/2013 | Berlin .......................... 156/62.2 |

* cited by examiner

METHODS FOR MAKING LIGNOCELLULOSE COMPOSITE PRODUCTS WITH OXIDATIVE BINDERS AND COMPLEXED METAL CATALYST

CROSS-REFERENCE TO RELATED APPLICATIONS

This application claims priority to U.S. Provisional Patent Application No. 61/974,308, filed on Apr. 2, 2014, which is incorporated by reference herein.

BACKGROUND

Field

Embodiments described generally relate to methods for making lignocellulose containing composite products. More particularly, such embodiments relate to methods for making composite products having oxidative binders that include lignocellulose substrates, one or more complexed metal catalysts, and one or more complexing agents, and methods for making and using same.

Description of the Related Art

The production of lignocellulose composite products requires an adhesive or binder to bond the discrete, particulates, fibers, veneers, or other substrates to one another. Typical lignocellulose composite products include particleboard, fiberboard, plywood, or oriented strand board (OSB). Conventional binders used in the production of these products frequently contain formaldehyde based resins, such as urea-formaldehyde (UF), melamine-formaldehyde (MF), melamine-urea-formaldehyde (MUF), and phenol-formaldehyde (PF). While these formaldehyde based resins produce finished products having desirable properties, such as strength (e.g., internal bond strength), these formaldehyde based resins also release formaldehyde into the environment during the production of the binder and the curing of the binder in the manufacture of a lignocellulose composite product, as well as, from the final composite product made using the binder.

Various techniques have been used to reduce the amount of formaldehyde released from formaldehyde based resins. For example, the addition of formaldehyde scavengers to the resin and/or various modifications to the particular synthesis steps used to make the formaldehyde based resin, such as the addition of urea as a reactant late in the binder synthesis, are often used in an attempt to reduce formaldehyde emission. These attempts to reduce formaldehyde emission, however, are accompanied with undesirable effects such as longer cure time, reduced resin shelf-life, reduced product strength, reduced tolerance for processing variations, and/or inferior moisture resistance.

There is a need, therefore, for improved methods for making composite products having reduced or no formaldehyde emission.

SUMMARY

Methods for making composite products and compositions of composite products are provided. In some examples, a method for making a composite product can include combining a plurality of lignocellulose substrates, one or more complexed metal catalysts, one or more complexing agents, and one or more oxidants to produce a lignocellulose binder mixture and heating the lignocellulose binder mixture to produce a composite product. The lignocellulose binder mixture can have a molar ratio of the complexing agent to the complexed metal catalyst of about 0.1 or greater.

In other examples, the method for making a composite product can include combining a plurality of lignocellulose substrates, one or more complexed metal catalysts, one or more complexing agents, one or more polyphenolic materials, and one or more oxidants to produce a lignocellulose binder mixture. The lignocellulose binder mixture can have a molar ratio of the complexing agent to the complexed metal catalyst of about 0.1 or greater. The method can also include maintaining the lignocellulose binder mixture at a temperature of less than 60° C. for at least 10 min, and subsequently heating the lignocellulose binder mixture to a temperature of at least 60° C. to produce a composite product.

In other examples, a composite product can include an at least partially cured lignocellulose binder mixture, that prior to curing, can include a plurality of lignocellulose substrates, one or more polyphenolic materials, one or more complexed metal catalysts, one or more complexing agents, and one or more oxidants. The lignocellulose binder mixture can have a molar ratio of the complexing agent to the complexed metal catalyst of about 0.1 or greater.

DETAILED DESCRIPTION

A plurality of lignocellulose substrates, one or more complexed metal catalysts, one or more complexing agents, and one or more oxidants can be mixed, blended, or otherwise combined to produce a lignocellulose binder mixture. The lignocellulose binder mixture can be heated to produce a composite product. In some examples, the lignocellulose binder mixture can have a molar ratio of the complexing agent to the complexed metal catalyst of about 0.1 or greater. For example, the lignocellulose binder mixture can have a molar ratio of the complexing agent to the complexed metal catalyst of about 0.1 to about 2 or about 0.5 to about 1. The lignocellulose binder mixture can be heated to a temperature of at least 60° C. to about 300° C. for about 0.1 min to about 30 min to produce the composite product. The lignocellulose binder mixture can be heated and pressed to produce the composite product. For example, the lignocellulose binder mixture can be heated and pressed to a pressure of about 0.5 MPa to about 15 MPa. In some examples, prior to heating the lignocellulose binder mixture, the lignocellulose binder mixture can be maintained at a predetermined temperature for a predetermined amount of time. For example, the lignocellulose binder mixture can be maintained at a temperature of less than 60° C. for at least 10 min to about 240 min, or a temperature of less than 50° C. for at least 30 min to about 120 min.

In other examples, the composite product, can include an at least partially cured lignocellulose binder mixture, where the lignocellulose binder mixture, prior to curing, can include the plurality of lignocellulose substrates, one or more complexed metal catalysts, one or more complexing agents, one or more polyphenolic materials, and one or more oxidants. In some examples, the composite product can have a density of less than 1.5 g/cm$^3$ and an internal bond strength of at least 0.35 MPa. The lignocellulose binder mixture, the at least partially cured mixture, and/or the composite product can each have a molar ratio of the complexing agent to the complexed metal catalyst of about 0.1 or greater. For example, the lignocellulose binder mixture, the at least partially cured mixture, and/or the composite product can each have a molar ratio of the complexing agent to the complexed metal catalyst of about 0.1 to about 2 or about 0.5 to about 1. In some examples, the lignocellulose binder mixture and the at least partially cured mixture can each include the plurality of lignocellulose substrates, one or more complexed metal catalysts, one or more complexing agents, one or more oxidants, one or more polyphenolic materials and/or one or more emulsion waxes, and the composite product can include the plurality of lignocellulose substrates, one or more complexed metal catalysts, one or more complexing agents, one or more polyphenolic materials, and/or one or more emulsion waxes.

The complexed metal catalyst can have one or more metals or metal cations, such as iron, copper, manganese, tungsten, or molybdenum. In one example, the complexed metal catalyst can be one or more complexed iron catalysts and the oxidant can be or include hydrogen peroxide. In some examples, the complexed metal catalyst can be iron ethylenediaminetetraacetate, iron (S,S)-ethylenediamine-N,N'-disuccinate, iron diethylenetriamine pentaacetate, iron ethlyleneglycol-bis(2-aminoethyl)-N,N,N',N'-tetraacetate, iron trans-1,2-diaminocyclohexanetetraacetate, potassium ferricyanide, salts thereof, acids thereof, hydrates thereof, or any mixture thereof. The lignocellulose binder mixture can include the complexed metal catalyst in an amount of about 0.05 wt % to about 5 wt %, based on a dry weight of the lignocellulose substrates, such as, for example, about 0.1 wt % to about 1 wt %.

The chelating or complexing agent can be combined or included in the lignocellulose binder mixture as one or more acids and/or one or more salts. Illustrative chelating or complexing agents can include, but are not limited to, ethylenediaminetetraacetate (EDTA), ethylenediamine-N,N'-disuccinate (EDDS), ethyleneglycol-bis(2-aminoethyl)-N,N,N',N'-tetraacetate (EGTA), diethylenetriaminepentaacetate (DTPA), trans-1,2-diaminocyclohexane tetraacetate (CDTA), iminodisuccinate (IDS), nitrilotriacetate (NTA), cyanide, sulfate, salts thereof, acids thereof, hydrates thereof, or any mixture thereof. The lignocellulose binder mixture can include the complexing agent in an amount of about 0.005 wt % to about 5 wt %, such as, for example, about 0.1 wt % to about 1 wt %, based on a dry weight of the lignocellulose substrates.

In some examples, the complexed metal catalyst and the complexing agent can each include the same ligand or chelate compound. For example, the complexed metal catalyst and the complexing agent can both contain ethylenediaminetetraacetate, such that the complexed metal catalyst can be iron ethylenediaminetetraacetate and the complexing agent can be one or more salts and/or acids of ethylenediaminetetraacetic acid (e.g., sodium, potassium, or ammonium ethylenediaminetetraacetate). In other examples, the complexed metal catalyst and the complexing agent can include different ligands or chelating compounds.

The plurality of lignocellulose substrates, such as wood particles, and two or more free radical precursors, such as one or more complexed metal catalysts, one or more complexing agents, and/or one or more oxidants, can be mixed, blended, stirred, contacted, or otherwise combined with one another to produce the lignocellulose binder mixture. Optionally, one or more polyphenolic materials, one or more unsaturated compounds, and/or one or more waxes can also be included in the lignocellulose binder mixture.

Any suitable free radical precursor or combination of free radical precursors can be used to produce the lignocellulose binder mixture. The free radical precursor can be a solid, liquid, gas, or multi-phase. As used herein, the phrase "free radical precursor" refers to any compound or mixture of compounds that can generate radicals when subjected to one or more predetermined conditions (e.g., a predetermined temperature). For example, the free radical precursor can include one or more oxidizing agents or oxidants (e.g., an inorganic oxidant such as hydrogen peroxide) and one or more catalysts (e.g., a complexed metal catalyst or a transition metal catalyst) or free radical precursor catalysts. The free radical precursor can generate radicals when the oxidant is subjected to reaction with the catalyst. As such, in some examples, the free radical precursor can include one or more oxidants and one or more catalysts.

Illustrative free radical precursors can include, but are not limited to, inorganic and/or organic peroxy compounds, ozonides, halogen containing oxidants, or any mixture thereof. Illustrative inorganic peroxy compounds can include, but are not limited to, hydrogen peroxide, hydrogen peroxide generating compounds, e.g., alkali metal salts or alkaline earth metal salts of percarbonate, perborate, peroxysulfate, peroxyphosphate, peroxysilicate, corresponding weak acids, or any mixture thereof. Illustrative hydrogen peroxide generating compounds can be or include alkali metal peroxides (e.g., $Na_2O_2$, $K_2O_2$, or $Li_2O_2$), alkaline earth metal peroxides (e.g., $CaO_2$, $BeO_2$, or $MgO_2$), nitric acid, salts thereof, acids thereof, hydrates thereof, or any mixture thereof. Illustrative organic peroxy compounds can include, but are not limited to t-butyl peroxide, benzoyl peroxide, peroxy carboxylic acids, e.g., peracetic acid and/or perbenzoic acid, succinic acid peroxide (also known as disuccinoylperoxide), hydroperoxides, e.g., t-butyl hydroperoxide. Illustrative halogen containing oxidants can include, but are not limited to, alkali metal chlorites, alkaline earth metal chlorites, alkali metal hypochlorites (e.g., NaClO), alkaline earth metal hypochlorites (e.g., $Ca(ClO)_2$), alkali metal perchlorates (e.g., $NaClO_4$, $KClO_4$, or $LiClO_4$), chlorine dioxide, a chloro sodium salt of cyanuric acid, salts thereof, acids thereof, hydrates thereof, or any mixture thereof. An illustrative ozonide can include, but is not limited to, dimethyloxirane. In some examples, the free radical precursor can be or include one or more inorganic oxidants. In some examples, the free radical precursor can be or include one or more inorganic peroxy compounds. In some examples, the free radical precursor can be or include hydrogen peroxide.

In some examples, if the free radical precursor includes one or more oxidants in the lignocellulose binder mixture, the one or more oxidants can be present in an amount of about 1 wt %, about 3 wt %, about 5 wt %, about 7 wt %, about 9 wt %, about 10 wt %, about 12 wt %, about 15 wt %, about 20 wt %, about 25 wt %, about 30 wt %, about 35 wt %, or about 40 wt % to about 60 wt %, about 65 wt %, about 70 wt %, about 75 wt %, about 80 wt %, about 85 wt %, about 90 wt %, about 95 wt %, about 99 wt %, about 99.5 wt %, or about 99.9 wt %, based on a dry weight of the lignocellulose substrates. For example, the lignocellulose binder mixture can include the oxidant in an amount of about 7 wt % to about 99 wt %, about 10 wt % to about 80 wt %, about 15 wt % to about 70 wt %, about 17 wt % to about 66 wt %, about 10 wt % to about 45 wt %, about 35 wt % to about 75 wt %, about 15 wt % to about 25 wt %, about 20 wt % to about 35 wt %, about 30 wt % to about 50 wt %, about 35 wt % to about 60 wt %, or about 45 wt % to about 80 wt %, based on a dry weight of the lignocellulose substrates.

In another example, the amount of the free radical precursor in the lignocellulose binder mixture can be present in an amount of at least 3 wt %, at least 5 wt %, at least 6 wt %, at least 7 wt %, at least 8 wt %, at least 9 wt %, at least 10 wt %, at least 15 wt %, at least 20 wt %, at least 25 wt % at least 20 wt %, at least 35 wt %, at least 40 wt %, or at least 45 wt % to about 50 wt %, about 55 wt %, about 60 wt %, about 65 wt %, about 70 wt %, about 75 wt %, about 80 wt %, about 85 wt %, about 90 wt %, or about 95 wt %, based on a dry weight of the lignocellulose substrates. In other examples, the amount of the free radical precursor in the lignocellulose binder mixture can be less than 95 wt %, less than 90 wt %, less than 85 wt %, less than 80 wt %, less than 75 wt %, less than 70 wt %, less than 60 wt %, less than 55 wt %, less than 50 wt %, less than 45 wt %, or less 40 wt % and greater than 2 wt %, greater than 5 wt %, greater than 6 wt %, greater than 7 wt %, greater than 8 wt %, greater than 9 wt %, greater than 10 wt %, greater than 15 wt %, greater than 20 wt %, or greater than 25 wt %, based on a dry weight of the lignocellulose substrates.

The free radical precursor can be combined with one or more liquid mediums. Illustrative liquid mediums can include, but are not limited to, water, alcohols, ethers, esters, other organic solvents, or any mixture thereof. For example, the free radical precursor can be or include an aqueous solution of hydrogen peroxide. The concentration of free radical precursor, e.g., hydrogen peroxide combined with a liquid medium such as water, can be about 1 wt %, about 3 wt %, about 5 wt %, about 10 wt %, about 15 wt %, about 20 wt %, about 25 wt %, or about 30 wt % to about 50 wt %, about 60 wt %, about 70 wt %, about 80 wt %, about 90 wt %, or about 98 wt %, based on the combined weight of the free radical precursor and the liquid medium.

The catalyst that can be present as a component of the free radical precursor, or as the free radical precursor itself, can also be referred to as an initiator, a promoter, a reducer, and/or an accelerator. Suitable catalysts can be or include, but are not limited to, metals, metal cations, tertiary amines, polymeric tertiary amines, phosphates, bisulfites, metabisulfites, tetraacetylethylenediamine, cyanamides, ultraviolet light, or any mixture thereof. In some examples, in addition to or in lieu of contacting the lignocellulose substrates (discussed below) with a free radical precursor and/or catalyst, ultrasonic waves, photo-Fenton and/or electro-Fenton reactions (in situ generation of hydroxyl radicals by radiation or electric currents) can be used. In some examples, the catalyst can have one or more metals or metal cations, such as a complexed metal catalyst, a metal oxide, and/or a metal salt. In some examples, the catalyst can be or include one or more transition metals with coordinated Lewis bases. In one or more examples, the catalyst can be or include one or more complexed iron catalysts or other metal catalysts and the oxidant can be or include hydrogen peroxide.

In some examples, the complexed metal catalyst can have one or more metals or metal cations, such as iron, copper, manganese, tungsten, or molybdenum, and one or more chelate compounds or ligands. The complexed metal catalyst can also have one or more acids, one or more salts, or one or more hydrates (e.g., water molecules) associated with the one or more metals or metal cations and/or the one or more chelate compounds or ligands.

In some examples, the lignocellulose binder mixture and/or the composite product can include the complexed metal catalyst in an amount of about 0.05 wt %, about 0.07 wt %, about 0.09 wt %, about 0.1 wt %, about 0.1 wt %, about 0.2 wt %, about 0.3 wt %, about 0.4 wt %, about 0.5 wt %, about 0.6 wt %, about 0.7 wt %, about 0.8 wt %, or about 0.9 wt % to about 1 wt %, about 1.5 wt % or greater, about 2 wt % or greater, about 2.5 wt % or greater, about 3 wt % or greater, about 3.5 wt % or greater, about 4 wt % or greater, about 4.5 wt % or greater, about 5 wt % or greater, about 6 wt % or greater, about 7 wt % or greater, about 8 wt % or greater, about 9 wt % or greater, about 10 wt % or greater, or about 15 wt % or greater, based on a dry weight of the lignocellulose substrates. The lignocellulose binder mixture and/or the composite product can include the complexed metal catalyst in an amount of about 0.05 wt % to about 5 wt % or greater, such as, for example, about 0.07 wt % to about 4 wt %, about 0.09 wt % to about 3 wt %, about 0.1 wt % to about 1 wt %, about 0.15 wt % to about 1 wt %, or about 0.15 wt % to about 0.5 wt %, based on a dry weight of the lignocellulose substrates.

In some examples, the catalyst can be a metal catalyst, such as a metal oxide, a metal sulfate, a complexed metal catalyst, or other metal containing catalyst containing iron or iron cations (e.g., $Fe^{2+}$ or $Fe^{3+}$). In some examples, the catalyst can be a metal catalyst, such as a metal oxide or sulfate. Illustrative iron oxides and iron sulfates can include iron(II) sulfate, iron(II) oxide, iron(III) sulfate, iron(III) oxide, or any mixture thereof. Other iron containing catalysts can include, but are not limited to, ferricyanide (e.g., $[Fe(CN)_6]^{3-}$), ferrocyanide (e.g., $[Fe(CN)_6]^{4-}$), and/or nitroprusside (e.g., $[Fe(CN)_5NO]^{2-}$), hydrates thereof, salts thereof, acids thereof, or any mixture thereof. For example, the catalyst can be or include, but is not limited to, potassium ferricyanide ($K_3[Fe(CN)_6]$), potassium ferrocyanide ($K_4[Fe(CN)_6]$), ammonium ferricyanide hydrate (($NH_4)_3[Fe(CN)_6].xH_2O$), ammonium ferrocyanide hydrate (($NH_4)_4[Fe(CN)_6].xH_2O$), sodium ferricyanide decahydrate ($Na_3[Fe(CN)_6].10H_2O$), sodium ferrocyanide decahydrate ($Na_4[Fe(CN)_6].10H_2O$), sodium nitroprusside dihydrate ($Na_2[Fe(CN)_5NO].H_2O$), hydrates thereof, salts thereof, acids thereof, or any mixture thereof.

In other examples, the catalyst can be a complexed metal catalyst that can include compounds or complexes containing iron or iron cations. Other suitable catalysts that contain iron can include, but are not limited to, Fe[EDTA], Fe[EDDS], Fe[DTPA], Fe[EGTA], Fe[CDTA], Fe[IDS], or any mixture thereof. In some specific examples, the catalyst can include ferricyanide, e.g., potassium ferricyanide, a complex of iron (e.g., ferric and/or ferrous) and ethylenediaminetetraacetic acid (EDTA), a complex of iron (e.g., ferric and/or ferrous) and (S,S)-ethylenediamine-N,N'-disuccinic acid ((S,S)-EDDS), a complex of iron (e.g., ferric and/or ferrous) and (R,R)-ethylenediamine-N,N'-disuccinic acid ((R,R)-EDDS), a complex of iron (e.g., ferric and/or ferrous) and (R,S)-ethylenediamine-N,N'-disuccinic acid ((R,S)-EDDS), a complex of iron (e.g., ferric and/or ferrous) and diethylenetriaminepentaacetic acid (DTPA), a complex of iron (e.g., ferric and/or ferrous) and trans-1,2-diaminocyclohexane tetraacetic acid (CDTA), a complex of iron (e.g., ferric and/or ferrous) and iminodisuccinate (IDS), hydrates thereof, salts thereof, acids thereof, or any mixture thereof.

In some specific examples, the complexed metal catalyst can be iron ethylenediaminetetraacetate, iron (S,S)-ethylenediamine-N,N'-disuccinate, iron diethylenetriamine pentaacetate, iron ethlyleneglycol-bis(2-aminoethyl)-N,N,N',N'-tetraacetate, iron trans-1,2-diaminocyclohexanetetraacetate, potassium ferricyanide, salts thereof, acids thereof, hydrates thereof, or any mixture thereof. Illustrative iron ethylenediaminetetraacetate compounds can include, but are not limited to, ferric ethylenediaminetetraacetate hydrate ($M_y[Fe(III) EDTA].xH_2O$) and ferrous ethylenediaminetetraacetate hydrate ($M_y[Fe(II) EDTA].xH_2O$), where "x" can be 0 to about 8, "y" can be 0 to about 4, and "M" can independently be one or more cations and/or neutral compounds, such as an alkali metal cation (e.g., $Na^+$, $K^+$, $Li^+$, or $Cs^+$), an alkaline earth metal cation (e.g., $Ca^{2+}$ or $Mg^{2+}$), an amine (e.g., $NH_4^+$, $(CH_3)_4N^+$, or $(CH_3)_3NH^+$), a solvent (e.g., ether or THF). In one example, the complexed metal catalyst can be sodium ferric ethylenediaminetetraacetate trihydrate (Na[Fe(III) EDTA].$3H_2O$).

In some examples, the chelating or complexing agent can be combined or included in the lignocellulose binder mixture as one or more acids and/or one or more salts. Illustrative chelating or complexing agents can include, but are not limited to, ethylenediaminetetraacetate (EDTA), ethylenediamine-N,N'-disuccinate (EDDS), ethyleneglycol-bis(2-aminoethyl)-N,N,N',N'-tetraacetate (EGTA), diethylenetriaminepentaacetate (DTPA), trans-1,2-diaminocyclohexane tetraacetate (CDTA), iminodisuccinate (IDS), nitrilotriacetate (NTA), phosphates, or complexing agents based on phosphonic acid, oxalic acid, ascorbic acid, nitrilotriacetic acid, gallic acid, fulvic acid, or polyoxometalates, cyanide, sulfate, salts thereof, acids thereof, hydrates thereof, or any mixture thereof.

In some examples, the lignocellulose binder mixture and/or the composite product can include the complexing agent in an amount of about 0.005 wt %, about 0.01 wt %, about 0.05 wt %, about 0.07 wt %, about 0.09 wt %, about 0.1 wt %, about 0.15 wt %, about 0.2 wt %, about 0.3 wt %, about 0.4 wt %, about 0.5 wt %, about 0.6 wt %, about 0.7 wt %, about 0.8 wt %, or about 0.9 wt % to about 1 wt % or greater, about 1.5 wt % or greater, about 2 wt % or greater, about 2.5 wt % or greater, about 3 wt % or greater, about 3.5 wt % or greater, about 4 wt % or greater, about 4.5 wt % or greater, about 5 wt % or greater, about 6 wt % or greater, about 7 wt % or greater, about 8 wt % or greater, about 9 wt % or greater, about 10 wt % or greater, or about 15 wt % or greater, based on a dry weight of the lignocellulose substrates. The lignocellulose binder mixture and/or the composite product can include the complexing agent in an amount of about 0.005 wt % to about 5 wt % or greater, such as, for example, about 0.01 wt % to about 4 wt %, about 0.05 wt % to about 3 wt %, about 0.1 wt % to about 1 wt %, about 0.15 wt % to about 1 wt %, or about 0.15 wt % to about 0.5 wt %, based on a dry weight of the lignocellulose substrates.

In some examples, the complexed metal catalyst and the complexing agent can each include the same ligand or chelate compound. For example, the complexed metal catalyst and the complexing agent can both contain ethylenediaminetetraacetate, such that the complexed metal catalyst can be iron ethylenediaminetetraacetate and the complexing agent can be one or more salts and/or acids of ethylenediaminetetraacetic acid (e.g., sodium, potassium, or ammonium).

The lignocellulose binder mixture and/or the composite product can have a molar ratio of the complexing agent to the complexed metal catalyst of about 0.01 or greater, about 0.05 or greater, about 0.1 or greater, about 0.15 or greater, about 0.2 or greater, about 0.25 or greater, about 0.3 or greater, about 0.35 or greater, about 0.4 or greater, about 0.45 or greater, about 0.5 or greater, about 0.55 or greater, about 0.6 or greater, about 0.65 or greater, about 0.7 or greater, about 0.75 or greater, about 0.8 or greater, about 0.85 or greater, about 0.9 or greater, or about 0.95 or greater to about 1 or greater, about 1.1 or greater, about 1.2 or greater, about 1.3 or greater, about 1.4 or greater, about 1.5 or greater, about 1.6 or greater, about 1.7 or greater, about 1.8 or greater, about 1.9 or greater, about 2 or greater, about 2.5 or greater, about 3 or greater, about 4 or greater, or about 5 or greater. The lignocellulose binder mixture and/or the composite product can have a molar ratio of the complexing agent to the complexed metal catalyst of about 0.1 or greater, such as, for example, about 0.1 to about 2, about 0.2 to about 2, about 0.25 to about 1.5, about 0.30 to about 1.2, about 0.4 to about 1.1, or about 0.5 to about 1, or about 0.1 to about 1.5, or about 0.1 to about 1.2, or about 0.1 to about 1.1, or about 0.1 to about 1, or about 0.1 to about 0.9, or about 0.1 to about 0.8, or about 0.1 to about 0.7, or about 0.1 to about 0.5.

In some examples, the lignocellulose binder mixture and/or the composite product can include a combined amount of the complexed metal catalyst and the complexing agent in an amount of about 0.005 wt %, about 0.01 wt %, about 0.05 wt %, about 0.07 wt %, about 0.09 wt %, about 0.1 wt %, about 0.15 wt %, about 0.2 wt %, about 0.3 wt %, about 0.4 wt %, about 0.5 wt %, about 0.6 wt %, about 0.7 wt %, about 0.8 wt %, or about 0.9 wt % to about 1 wt % or greater, about 1.5 wt % or greater, about 2 wt % or greater, about 2.5 wt % or greater, about 3 wt % or greater, about 3.5 wt % or greater, about 4 wt % or greater, about 4.5 wt % or greater, about 5 wt % or greater, about 6 wt % or greater, about 7 wt % or greater, about 8 wt % or greater, about 9 wt % or greater, about 10 wt % or greater, or about 15 wt % or greater, based on a dry weight of the lignocellulose substrates. The lignocellulose binder mixture and/or the composite product can include a combined amount of the complexed metal catalyst and the complexing agent in an amount of about 0.05 wt % to about 10 wt % or greater, such as, for example, about 0.05 wt % to about 5 wt %, about 0.07 wt % to about 4 wt %, about 0.09 wt % to about 3 wt %, about 0.1 wt % to about 1 wt %, about 0.15 wt % to about 1 wt %, or about 0.15 wt % to about 0.5 wt %, based on a dry weight of the lignocellulose substrates.

Tertiary amines can be represented by the general formula NRR'R", where each R, R', and R" can independently be an alkyl, a cycloalkyl, a heterocycloalkyl, an aryl, a heteroaryl, or a substituted aryl. The alkyl can include branched or unbranched alkyls having 1 carbon atom to about 15 carbon atoms, or 1 carbon atom to about 8 carbon atoms. Illustrative alkyls can include, but are not limited to, methyl, ethyl, n-propyl, iso-propyl, n-butyl, sec-butyl, tert-butyl, n-pentyl, n-hexyl, ethylhexyl, isomers thereof, substituted alkyls thereof, or any mixture thereof. The cycloalkyls can include 3 carbon atoms to about 7 carbon atoms. Illustrative cycloalkyls can include, but are not limited to, cyclopentyl, substituted cyclopentyl, cyclohexyl, and substituted cyclohexyl. The term "aryl" refers to an aromatic substituent containing a single aromatic ring or multiple aromatic rings that are fused together, linked covalently, or linked to a common group such as a methylene or ethylene moiety. Greater specific aryl groups can include one aromatic ring or two or three fused or linked aromatic rings, e.g., phenyl, naphthyl, biphenyl, anthracenyl, or phenanthrenyl. The aryl substituents can include 1 carbon atom to about 20 carbon atoms. The term "heteroatom-containing", as in a "heteroatom-containing cycloalkyl group", refers to a molecule or molecular fragment in which one or more carbon atoms is replaced with an atom other than carbon, e.g., nitrogen, oxygen, sulfur, phosphorus, boron, or silicon. Similarly, the term "heteroaryl" refers to an aryl substituent that is heteroatom-containing. The term "substituted", as in "substituted aryls", refers to a molecule or molecular fragment in which at least one hydrogen atom bound to a carbon atom is replaced with one or more substituents that are functional groups such as hydroxyl, alkoxy, alkylthio, phosphino, amino, halo, or silyl. Illustrative tertiary amines can include, but are not limited to, trimethylamine, triethylamine, triethanolamine, or any mixture thereof. Illustrative polymeric tertiary amines can include, but are not limited to, poly(N-methyldiallyl amine), poly(N-dimethylvinyl amine), copolymers of N-dimethylvinyl amine, or any mixture thereof.

Illustrative phosphates can be or include, but are not limited to, potassium phosphate, sodium phosphate, ammonium phosphate, or any combination or mixture thereof. Illustrative bisulfites can include sodium bisulfite. Illustrative metabisulfites can be or include, but are not limited to, sodium metabisulfite, potassium metabisulfite, or any combination or mixture thereof. Illustrative cyanamides can include, but are not limited to, cyanamide, calcium cyanamide, sodium hydrogen cyanamide, or any mixture thereof.

The catalyst, if combined with a liquid medium, can have a total concentration of solids of about 0.001 wt % to about 99.9 wt %. In some examples, if the catalyst is combined with a liquid medium, the catalyst and liquid medium mixture can have a concentration of solids of about 0.1 wt %, about 0.5 wt %, about 1 wt %, or about 2 wt % to about 4 wt %, about 5 wt %, about 6 wt %, about 7 wt %, or about 8 wt %, based on the combined weight of the catalyst and the liquid medium.

The amount of catalyst present in the binder composition (e.g., without wood particles or a plurality of substrates) can widely vary. For example, the amount of catalyst in the binder composition can be about 0.01 wt %, about 0.1 wt %, about 0.5 wt %, about 1 wt %, or about 3 wt % to about 8 wt %, about 10 wt %, about 12 wt %, about 14 wt %, about 17 wt %, or about 20 wt %, based on the combined weight of the complexed metal catalyst, the complexing agent, the oxidant, the polyphenolic material (if any), and wax (if any), or based on the combined weight of the polyphenolic material, the unsaturated compound, and the free radical precursor, where the catalyst is a component or part of the free radical precursor. In another example, the amount of catalyst in the binder composition can be about 1 wt % to about 5 wt %, about 3 wt % to about 13 wt %, about 0.1 wt % to about 9 wt %, about 1 wt % to about 7 wt %, about 7 wt % to about 15 wt %, or about 0.2 wt % to about 15 wt %, based on the combined weight of the complexed metal catalyst, the complexing agent, the oxidant, the polyphenolic material (if any), and wax (if any), or based on the combined weight of the polyphenolic material, the unsaturated compound, and the free radical precursor, where the catalyst is a component or part of the free radical precursor. In another example, the amount of catalyst in the binder composition can be about 0.0001 wt %, about 0.001 wt %, about 0.01 wt %, about 0.1 wt %, about 0.13 wt %, or about 0.15 wt % to about 0.17 wt %, about 0.2 wt %, about 0.23 wt %, about 0.25 wt %, about 0.27 wt %, about 0.3 wt %, about 0.35 wt %, about 0.4 wt %, about 0.5 wt %, about 1 wt %, about 2 wt %, about 3 wt %, about 4 wt %, about 5 wt %, about 6 wt %, about 7 wt %, about 8 wt %, about 9 wt %, or about 10 wt %, based on the combined weight of the complexed metal catalyst, the complexing agent, the oxidant, the polyphenolic material (if any), and wax (if any), or based on the combined weight of the polyphenolic material, the unsaturated compound, the catalyst, and the oxidant, where the catalyst is a component of the free radical precursor. In another example, the amount of catalyst in the binder composition can be about 0.01 wt % to about 2 wt %, about 0.17 wt % to about 0.37 wt %, about 0.19 wt % to about 0.31 wt %, about 0.2 wt % to about 0.29 wt %, about 0.05 wt % to about 1.5 wt %, or about 0.2 wt % to about 2 wt %, based on the combined weight of the complexed metal catalyst, the complexing agent, the oxidant, the polyphenolic material (if any), and wax (if any), or based on the combined weight of the polyphenolic material, the unsaturated compound, the catalyst, and the oxidant, where the catalyst is a component of the free radical precursor.

The free radical precursor can be present in the binder composition in an amount of about 5 wt %, about 10 wt %, about 20 wt %, about 30 wt %, about 40 wt %, about 50 wt %, about 60 wt %, about 70 wt %, or about 80 wt % to about 120 wt %, about 130 wt %, about 140 wt %, about 150 wt %, about 160 wt %, about 170 wt %, about 180 wt %, about 190 wt %, or about 200 wt %, based on the weight of the polyphenolic material. For example, the free radical precursor can be present in the binder composition in an amount of about 25 wt % to about 95 wt %, about 35 wt % to about 85 wt %, about 45 wt % to about 85 wt %, about 45 wt % to about 65 wt %, about 45 wt % to about 60 wt %, about 50 wt % to about 60 wt %, or about 55 wt % to about 75 wt %, based on the weight of the polyphenolic material.

The free radical precursor can be present in the binder composition in an amount of about 10 wt %, about 30 wt %, about 50 wt %, about 70 wt %, about 90 wt %, about 110 wt %, or about 130 wt % to 160 wt %, about 180 wt %, about 200 wt %, about 220 wt %, about 240 wt %, about 260 wt %, about 280 wt %, or about 300 wt %, based on the weight of the unsaturated compound. For example, the free radical precursor can be present in the binder composition in an amount of about 30 wt % to about 100 wt %, about 40 wt % to about 95 wt %, about 65 wt % to about 105 wt %, about 70 wt % to about 90 wt %, about 75 wt % to about 85 wt %, about 75 wt % to about 80 wt %, about 80 wt % to about 95 wt %, about 80 wt % to about 155 wt %, about 70 wt % to about 150 wt %, or about 60 wt % to about 145 wt %, based on the weight of the unsaturated compound.

The free radical precursor can be present in the binder composition in an amount of about 5 wt %, about 8 wt %, about 12 wt %, about 14 wt %, about 18 wt %, about 22 wt %, about 26 wt %, or about 28 wt % to about 40 wt %, about 45 wt %, about 50 wt %, about 55 wt %, about 60 wt %, about 65 wt %, or about 70 wt %, based on the combined weight of the polyphenolic material, the unsaturated compound, and the free radical precursor. For example, the free radical precursor can be present in the binder composition in an amount of about 5 wt % to about 45 wt %, about 15 wt % to about 25 wt %, about 10 wt % to about 20 wt %, about 20 wt % to about 30 wt %, about 25 wt % to about 40 wt %, about 25 wt % to about 50 wt %, about 30 wt % to about 60 wt %, about 40 wt % to about 70 wt %, or about 15 wt % to about 55 wt %, based on the combined weight of the polyphenolic material, the unsaturated compound, and the free radical precursor.

If the free radical precursor includes one or more oxidants, the one or more oxidants can be present in an amount of about 1 wt %, about 3 wt %, about 5 wt %, about 7 wt %, about 9 wt %, about 10 wt %, about 12 wt %, about 15 wt %, about 20 wt %, about 25 wt %, about 30 wt %, about 35 wt %, or about 40 wt % to about 60 wt %, about 65 wt %, about 70 wt %, about 75 wt %, about 80 wt %, about 85 wt %, about 90 wt %, about 95 wt %, or about 99 wt %, based on the combined weight of the polyphenolic material, the unsaturated compound, and the free radical precursor. For example, the binder composition can include the oxidant in an amount of about 7 wt % to about 99 wt %, about 10 wt % to about 80 wt %, about 15 wt % to about 70 wt %, about 17 wt % to about 66 wt %, about 10 wt % to about 45 wt %, about 35 wt % to about 75 wt %, about 15 wt % to about 25 wt %, about 20 wt % to about 35 wt %, about 30 wt % to about 50 wt %, about 35 wt % to about 60 wt %, or about 45 wt % to about 80 wt %, based on the combined weight of the polyphenolic material, the unsaturated compound, and the free radical precursor.

In some examples, the amount of the free radical precursor in the binder composition can be at least 3 wt %, at least 5 wt %, at least 6 wt %, at least 7 wt %, at least 8 wt %, at least 9 wt %, at least 10 wt %, at least 15 wt %, at least 20 wt %, at least 25 wt % at least 20 wt %, at least 35 wt %, at least 40 wt %, or at least 45 wt % to about 50 wt %, about 55 wt %, about 60 wt %, about 65 wt %, about 70 wt %, about 75 wt %, about 80 wt %, about 85 wt %, about 90 wt %, or about 95 wt %, based on the combined weight of the polyphenolic material, the unsaturated compound, and the free radical precursor. In other examples, the amount of the free radical precursor in the binder composition can be less than 95 wt %, less than 90 wt %, less than 85 wt %, less than 80 wt %, less than 75 wt %, less than 70 wt %, less than 60 wt %, less than 55 wt %, less than 50 wt %, less than 45 wt %, or less 40 wt % and greater than 2 wt %, greater than 5 wt %, greater than 6 wt %, greater than 7 wt %, greater than 8 wt %, greater than 9 wt %, greater than 10 wt %, greater than 15 wt %, greater than 20 wt %, or greater than 25 wt %, based on the combined weight of the polyphenolic material, the unsaturated compound, and the free radical precursor.

The pH of the binder composition can be acidic, neutral, or basic. For example, the pH of the binder composition can be about 0.5, about 2, about 3, or about 4 to about 7, about 7.5, about 8, about 8.5, or about 9. For example, the binder composition can have a pH of about 1.5 to about 9, about 2.5 to about 7, about 1 to about 5, about 5 to about 8, or about 3 to about 6. The pH of the binder composition can be adjusted to any predetermined pH by combining one or more base compounds, one or more acid compounds, or a combination of one or more base compounds and one or more acid compounds therewith.

Illustrative base compounds that can be used to adjust the pH of the binder composition can include, but are not limited to, hydroxides, carbonates, ammonia, amines, or any mixture thereof. Illustrative hydroxides can include, but are not limited to, sodium hydroxide, potassium hydroxide, ammonium hydroxide (e.g., aqueous ammonia), lithium hydroxide, cesium hydroxide, or any mixture thereof. Illustrative carbonates can include, but are not limited to, sodium carbonate, sodium bicarbonate, potassium carbonate, ammonium carbonate, or any mixture thereof. Illustrative amines can include, but are not limited to, trimethylamine, triethylamine, triethanolamine, diisopropylethylamine (Hunig's base), pyridine, 4-dimethylaminopyridine (DMAP), and 1,4-diazabicyclo[2.2.2]octane (DABCO), or any mixture thereof.

Illustrative acid compounds that can be used to adjust the pH of the binder composition can include, but are not limited to, one or more mineral acids, one or more organic acids, one or more acid salts, or any mixture thereof. Illustrative mineral acids can include, but are not limited to, hydrochloric acid, nitric acid, phosphoric acid, sulfuric acid, or any mixture thereof. Illustrative organic acids can include, but are not limited to, acetic acid, formic acid, citric acid, oxalic acid, uric acid, lactic acid, or any mixture thereof. Illustrative acid salts can include, but are not limited to, ammonium sulfate, sodium, sodium bisulfate, sodium metabisulfite, or any mixture thereof.

In some examples, one or more polyphenolic materials, one or more unsaturated compounds, and two or more free radical precursors (e.g., one or more complexed metal catalysts, one or more complexing agents, and one or more oxidants) can be mixed, blended, stirred, contacted, or otherwise combined with one another to produce the binder composition. In other examples, one or more polyphenolic materials and two or more free radical precursors can be mixed, blended, stirred, contacted, or otherwise combined with one another to produce the binder composition. In other examples, one or more unsaturated compounds and two or more free radical precursors can be mixed, blended, stirred, contacted, or otherwise combined with one another to produce the binder composition. The binder composition can be combined with a plurality of lignocellulose substrates to produce the lignocellulose binder mixture. The lignocellulose binder mixture can also be referred to as a "furnish", "blended furnish", "resinated mixture", or "resinated furnish".

As used herein, the terms "unsaturated compound" and "reactive unsaturated compound" are used interchangeably and refer to compounds having two or more unsaturated carbon-carbon bonds, where at least one of the unsaturated carbon-carbon bonds is capable of free radical addition. As used herein, the phrase "capable of free radical addition" when used in conjunction with "unsaturated compound" means that the carbon-carbon double bond is a pi-bond ($\pi$-bond) that is not conjugated with an aromatic moiety and is capable of going through a free radical chain reaction mechanism. The free radical chain mechanism can include an initiation step, a propagation step, and a termination step. The polyphenolic compound can be or include a compound having at least two hydrogen atoms that are abstractable in the presence of hydroxyl radicals. The polyphenolic material can be, but is not limited to, one or more lignins, one or more tannins, one or more novolac resins, one or more modified phenol formaldehyde resins, bisphenol A, humic acids, or any mixture thereof.

In some examples, the unsaturated carbon-carbon bond capable of free radical addition can be an alkene conjugated with a carbonyl group in an $\alpha,\beta$-unsaturated carbonyl compound. The $\alpha,\beta$-unsaturated carbonyl compound can include, but is not limited to, an aldehyde, a ketone, a carboxylic acid, an ester, an amide, an acyl halide, an acid anhydride, or an imide. For example, the $\alpha,\beta$-unsaturated carbonyl compound can be, but is not limited to, an $\alpha,\beta$-unsaturated aldehyde (e.g., an enal), an $\alpha,\beta$-unsaturated ketone (e.g., an enone), an $\alpha,\beta$-unsaturated carboxylic acid, an $\alpha,\beta$-unsaturated ester, an $\alpha,\beta$-unsaturated amide, an $\alpha,\beta$-unsaturated acyl halide, an $\alpha,\beta$-unsaturated acid anhydride, or an $\alpha,\beta$-unsaturated imide. In some examples, the unsaturated compound can be substantially free or completely free from any aromatic moiety.

The polyphenolic material can be present in the binder composition in an amount of about 1 wt %, about 5 wt %, about 10 wt %, about 15 wt %, about 20 wt %, about 25 wt %, about 30 wt %, or about 35 wt % to about 55 wt %, about 60 wt %, about 65 wt %, about 70 wt %, about 75 wt %, about 80 wt %, about 85 wt %, about 90 wt %, about 95 wt %, or about 99 wt %, based on the combined weight of the polyphenolic material, the unsaturated compound, and the free radical precursor. For example, the polyphenolic material can be present in the binder composition in an amount of about 20 wt % to about 60 wt %, about 30 wt % to about 60 wt %, about 35 wt % to about 55 wt %, about 40 wt % to about 50 wt %, about 45 wt % to about 65 wt %, about 50 wt % to about 75 wt %, or about 55 wt % to about 85 wt %, based on the combined weight of the polyphenolic material, the unsaturated compound, and the free radical precursor.

The polyphenolic material can be present in the binder composition in an amount of about 1 wt %, about 5 wt %, about 10 wt %, about 15 wt %, about 20 wt %, about 25 wt %, about 30 wt %, or about 35 wt % to about 55 wt %, about 60 wt %, about 65 wt %, about 70 wt %, about 75 wt %, about 80 wt %, about 85 wt %, about 90 wt %, about 95 wt %, or about 99 wt %, based on the combined weight of the polyphenolic material and the unsaturated compound. For example, the polyphenolic material can be present in the binder composition in an amount of about 20 wt % to about 60 wt %, about 30 wt % to about 60 wt %, about 35 wt % to about 55 wt %, about 40 wt % to about 50 wt %, about 45 wt % to about 65 wt %, about 50 wt % to about 75 wt %, about 50 wt % to about 70 wt %, about 55 wt % to about 65 wt %, or about 55 wt % to about 85 wt %, based on the combined weight of the polyphenolic material and the unsaturated compound.

The unsaturated compound can be present in the binder composition in an amount of about 5 wt %, about 10 wt %, about 15 wt %, about 20 wt %, or about 25 wt % to about 40 wt %, about 45 wt %, about 50 wt %, about 55 wt %, about 60 wt %, about 65 wt %, or about 70 wt %, based on the combined weight of the polyphenolic material, the unsaturated compound, and the free radical precursor. For example, the unsaturated compound can be present in the binder composition in an amount of about 15 wt % to about 45 wt %, about 20 wt % to about 40 wt %, about 25 wt % to about 35 wt %, about 30 wt % to about 40 wt %, or about 30 wt % to about 60 wt %, about 40 wt % to about 55 wt %, based on the combined weight of the polyphenolic material, the unsaturated compound, and the free radical precursor.

The unsaturated compound can be present in the binder composition in an amount of about 5 wt %, about 10 wt %, about 15 wt %, about 20 wt %, or about 25 wt % to about 40 wt %, about 45 wt %, about 50 wt %, about 55 wt %, about 60 wt %, about 65 wt %, about 70 wt %, or about 75 wt %, based on the combined weight of the polyphenolic material and the unsaturated compound. For example, the unsaturated compound can be present in the binder composition in an amount of about 15 wt % to about 45 wt %, about 20 wt % to about 40 wt %, about 25 wt % to about 35 wt %, about 35 wt % to about 45 wt %, about 30 wt % to about 40 wt %, or about 30 wt % to about 60 wt %, about 40 wt % to about 55 wt %, based on the combined weight of the polyphenolic material and the unsaturated compound.

Illustrative polyphenolic compounds or materials can include, but are not limited to, lignins, lignosulfonates, modified lignins, tannins, novolac resins, modified phenol formaldehyde resins, bisphenol A, humic acids, salts thereof, acids thereof, hydrates thereof, or any mixture thereof. In some examples, the polyphenolic material can include one or more lignin compounds, such as lignosulfonates. Illustrative lignin compounds can include ammonium lignosulfonate, sodium lignosulfonate, calcium lignosulfonate, potassium lignosulfonate, magnesium lignosulfonate, cesium lignosulfonate, modified lignins, salts thereof, acids thereof, hydrates thereof, or any mixture thereof.

The polyphenolic material can be in a liquid form, a solid form, or both. The liquid form can include solutions, suspensions, slurries, dispersions, emulsions, inverse emulsions, or other liquid forms. In at least one example, a liquid form of the polyphenolic material can be a solution, e.g., an aqueous solution. For example, one or more polyphenolic compounds can be dissolved in one or more liquids to produce a solution. In at least one example, the liquid form of the polyphenolic material be or include a solid polyphenolic compound suspended, dispersed, or otherwise distributed within a liquid medium, e.g., a suspension, slurry, or dispersion. In at least one other example, the liquid form of the polyphenolic material can be or can essentially be composed of one or more polyphenolic compounds. As such, the polyphenolic material can be a liquid in the absence or substantial absence of any liquid medium as compared to being dissolved, dispersed, suspended, mixed, or otherwise combined with a liquid medium.

If the liquid form of the polyphenolic material includes a solid polyphenolic compound dissolved, suspended, dispersed or otherwise distributed within a liquid medium, any suitable liquid medium or combination of liquid mediums can be used. Illustrative liquid mediums can be or include, but are not limited to, water, alcohols, glycols, acetonitrile, dimethyl sulfoxide, N,N-dimethylformamide, N-methylpyrrolidone, or any mixture thereof. Suitable alcohols can include, but are not limited to, methanol, ethanol, propanol, isopropanol, butanol, or any mixture thereof. Suitable glycols can include, but are not limited to, ethylene glycol, propylene glycol, or a mixture thereof. As used herein, the terms "aqueous medium" and "aqueous liquid" are used interchangeably and can be or include water and/or mixtures composed of water and/or other water-miscible solvents. Illustrative water-miscible solvents can include, but are not limited to, alcohols, ethers, amines, and other polar aprotic solvents.

A polyphenolic material that includes a liquid medium can include about 0.1 wt %, about 1 wt %, about 3 wt %, about 5 wt %, about 10 wt %, about 20 wt %, about 30 wt %, about 40 wt %, about 43 wt %, or about 46 wt % to about 49 wt %, about 53 wt %, about 55 wt %, about 58 wt %, about 60 wt %, about 65 wt %, about 70 wt %, about 80 wt %, about 90 wt %, about 95 wt %, about 99 wt %, or about 99.9 wt % of polyphenolic material, based on the combined weight of the polyphenolic material and the liquid medium. For example, the polyphenolic material in the form of a two phase mixture can include about 0.1 wt % to about 30 wt %, about 1 wt % to about 20 wt %, about 5 wt % to about 50 wt %, about 10 wt % to about 70 wt %, about 0.5 wt % to about 25 wt %, about 3 wt % to about 6 wt %, about 2 wt % to about 8 wt %, about 45 wt % to about 50 wt %, about 55 wt % to about 60 wt %, about 46 wt % to about 49 wt %, or about 56 wt % to about 59 wt % of the polyphenolic material, based on the combined weight of the polyphenolic material and the liquid medium. In another example, the polyphenolic material in the form of a two phase mixture can include about 0.1 wt % to about 10 wt %, about 1 wt % to about 12 wt %, about 2 wt % to about 9 wt %, about 3 wt % to about 9 wt %, about 5 wt % to about 15 wt %, about 4 wt % to about 6 wt %, about 8 wt % to about 20 wt %, or about 2 wt % to about 10 wt % of the polyphenolic material, based on the combined weight of the polyphenolic material and the liquid medium.

In another example, a polyphenolic material in the form of a solution, e.g., an aqueous solution, can include about 0.1 wt % to about 30 wt %, about 1 wt % to about 20 wt %, about 5 wt % to about 50 wt %, about 10 wt % to about 70 wt %, about 0.5 wt % to about 25 wt %, about 3 wt % to about 6 wt %, about 2 wt % to about 8 wt %, about 45 wt % to about 50 wt %, about 55 wt % to about 60 wt %, about 46 wt % to about 49 wt %, or about 56 wt % to about 59 wt % of the polyphenolic material, based on the combined weight of the polyphenolic material and the liquid medium. In another example, the polyphenolic material in the form of a solution can include about 0.1 wt % to about 10 wt %, about 1 wt % to about 12 wt %, about 2 wt % to about 9 wt %, about 3 wt % to about 9 wt %, about 5 wt % to about 15 wt %, about 4 wt % to about 6 wt %, about 8 wt % to about 20 wt %, or about 2 wt % to about 10 wt % of the polyphenolic material, based on the combined weight of the polyphenolic material and the liquid medium.

As used herein, the solids concentration or solids content of a solution or solid/liquid mixture, e.g., polyphenolic material, as understood by those skilled in the art, can be measured by determining the weight loss upon heating a small sample (e.g., about 1 g to about 5 g) of the lignocellulose binder mixture to a suitable temperature (e.g., about 125° C.), and a time sufficient to remove the liquid medium combined therewith. By measuring the weight of the sample before and after heating, the percent solids in the sample can be directly calculated or otherwise estimated.

Suitable solid polyphenolic materials can be in the form of a powder, flakes, granules, pellets, beads, or other solid particulate form. Polyphenolic materials in the form of a powder can have an average particle size of about 0.05 microns, about 0.1 micron, about 0.6 microns, about 1 micron, about 5 microns, about 7 microns or about 10 microns to about 115 microns, about 225 microns, about 350 microns, about 425 microns, or about 500 microns. In another example, the polyphenolic material can have an average particle size of about 0.3 microns to about 160 microns, about 22 microns to about 48 microns, about 35 microns to about 60 microns, about 50 microns to about 75 microns or about 70 microns to about 120 microns about 30 microns to about 70 microns, about 60 microns to about 150 microns, about 100 microns to about 200 microns, about 175 microns to about 325 microns, about 220 microns to about 400 microns, or about 385 microns to about 500 microns.

A liquid polyphenolic material, e.g., an aqueous solution containing a polyphenolic compound, can be dried via any suitable process or combination of processes to produce a solid polyphenolic material. Illustrative processes for producing the particulate binder composition can include, but are not limited to, spray-drying, freeze drying, drum drying, pulse combustion drying, vacuum drying, precipitation, air drying, and/or dry spinning. For example, the liquid polyphenolic material can be spray-dried to provide a particulate or otherwise solid polyphenolic material.

Spray-drying refers to the process of producing a dry particulate solid product or particulate from a liquid mixture. The process can include spraying or atomizing the liquid polyphenolic material, e.g., forming small droplets, into a temperature controlled gas stream to evaporate the liquid from the atomized droplets and produce the particulate polyphenolic material. For example, in the spray-drying process, the liquid polyphenolic material can be atomized to small droplets and mixed with a hot gas, e.g., air, to evaporate the liquid from the droplets. The temperature of the liquid mixture during the spray-drying process can usually be close to or greater than the boiling temperature of the liquid. An outlet air temperature of about 60° C. to about 120° C. can generally be used. The particle size and liquid, e.g., moisture, content of the spray dried particulate polyphenolic material can be adjusted, controlled, or otherwise influenced by one or more process variables, such as the gas feed rate, gas temperature, the feed rate of the liquid polyphenolic material, the temperature of the liquid polyphenolic material, the liquid droplet size, the solids concentration of the liquid polyphenolic material, or any combination thereof. The spray-dried particulate polyphenolic material can have a liquid, e.g., moisture, content of less than about 10 wt %, less than about 8 wt %, less than about 6 wt %, less than about 5 wt %, less than about 4 wt %, less than about 3 wt %, less than about 2 wt %, or less than about 1 wt %.

If the polyphenolic material includes two or more polyphenolic materials, e.g., a solid polyphenolic material and a liquid polyphenolic material, or two solid polyphenolic materials, or two liquid polyphenolic materials, the amount of each polyphenolic material can widely vary. For example, a polyphenolic material that includes a first polyphenolic material and a second polyphenolic can include about 1 wt % to about 99 wt % of the first polyphenolic material and conversely about 99 wt % to about 1 wt % of the second polyphenolic material, based on the total weight of the polyphenolic material, e.g., the total weight of the first and second polyphenolic materials. In another example, the amount of the first polyphenolic material can be from a low of about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the total weight of the first and second polyphenolic materials.

Lignin is a polymeric substance that can include substituted aromatics found in plant and vegetable matter associated with cellulose and other plant constituents. Illustrative plant and vegetable matter can include, but is not limited to, straw, hemp, sisal, cotton stalk, wheat, bamboo, sabai grass, rice straw, banana leaves, paper mulberry (e.g., bast fiber), abaca leaves, pineapple leaves, esparto grass leaves, jute fibers from the genus *Hesperaloe* in the family Agavaceae, salt water reeds, palm fronds, flax, ground nut shells, hardwoods, softwoods, recycled fiberboards such as high density fiberboard, medium density fiberboard, low density fiberboard, oriented strand board, particleboard, or any combination thereof. For example, the plant matter can be or include wood, for example hardwoods, softwoods, or a combination thereof. Illustrative types of wood can include, but are not limited to, alder, ash, aspen, basswood, beech, birch, cedar, cherry, cottonwood, cypress, elm, fir, gum, hackberry, hickory, maple, oak, pecan, pine, poplar, redwood, sassafras, spruce, sycamore, walnut, and willow.

The lignin can be extracted, separated, or otherwise recovered from the wood, plant, and/or vegetable matter using any of a number of processes. For example, in the pulp and paper industry, lignin-containing materials such as wood, straw, corn stalks, bagasse, and other vegetable and plant tissues can be processed to recover the cellulose or pulp via the kraft or sulfate process or the sulfite process. The residual pulping liquors that include the lignin as a byproduct can be a source of lignin. The chemical structure of lignin can vary and the variation can depend, at least in part, on the particular plant from which the lignin is recovered from, location the plant was grown, and/or on the particular method used in recovery or isolation of the lignin from the plant and/or vegetable matter. Lignin can include active groups, such as active hydrogens and/or phenolic hydroxyl groups through which crosslinking or bridging can be effected.

One process for recovering lignin can be or include the process commonly referred to as the organosolv process. The organosolv process uses an organic solvent to solubilize lignin and hemicelluloses. The organosolv process can include contacting lignocellulose material, e.g., wood chips or particles, with an aqueous organic solvent at a temperature of about 130° C., about 140° C., or about 150° C. to about 200° C., about 220° C., or about 230° C. The lignin can break down by hydrolytic cleavage of alpha aryl-ether links into fragments that can be solubilized in the solvent system. Illustrative solvents can include, but are not limited to, acetone, methanol, ethanol, butanol, ethylene glycol, formic acid, acetic acid, or any mixture thereof. The aqueous organic solvent can have a concentration of the solvent in water of about 30 wt %, about 40 wt % or about 50 wt % to about 70 wt %, about 80 wt %, or about 90 wt %.

Since the lignin separated from the plant can be chemically altered from that found in the plant, the term "lignin", can also refer to lignin products obtained upon separation from the cellulose or recovered from the plant matter. For example, in a sulfite pulping process, the lignocellulose material can be digested with a bisulfite or sulfite resulting in the at least partial sulfonation of the lignin. As such, the lignin can optionally be subjected to further cleavage and/or other modifications such as alkaline treatment or reaction with other constituents to decrease the sulfonate or sulfur content and/or increase the active groups. For example, the lignin can be processed such that the lignin has a phenolic hydroxyl content of about 1.5 wt % to about 5 wt % and a sulfonate or sulfur content of less than 3 wt %.

In other methods of recovery or separation of lignin from wood, plant, or vegetable material, the lignin may not be sulfonated, but could be chemically altered somewhat in some other manner. For example, in residual pulping liquors obtained in sulfate or other alkaline pulping processes, the lignin can be present as an alkali metal salt dissolved in the alkaline, aqueous liquor and can generally include a sufficient phenolic hydroxyl content to require no further modification. However, the alkali or kraft lignin can be further reacted with other constituents to further increase the active groups. "Hydrolysis lignin" that can be recovered from the hydrolysis of lignocellulose materials in the manufacture of sugar, for example, can also be altered somewhat from that found in the plant. As such hydrolysis lignin can be further modified to solubilize the lignin as well as to increase the phenolic hydroxyl content. Also, the lignin products such as residual pulping liquor may be subjected to various treatments such as, for example, acid, alkaline or heat treatments or reacted with the other chemicals which may further alter somewhat the lignin constituents.

The residual pulping liquors or the lignin products produced in the separation or recovery of lignin from the plant matter can include lignin of various weight average molecular weights (MW) of about 300 to about 100,000 or greater. For example, the lignin can have a MW of about 500, about 1,000, about 5,000, about 10,000, about 15,000, or about 20,000 to about 30,000, about 45,000, about 55,000, about 70,000, about 80,000, about 85,000, about 90,000, or about 95,000. In another example, the lignin can have a MW of about 300, about 500, about 800, about 900, about 1,000, or about 1,100 to about 1,300, about 1,500, about 1,900, about 2,300, about 2,500, about 2,700, about 3,000, about 3,300, about 3,500, about 3,700, about 4,000, about 4,300, about 4,500, about 4,700, or about 5,000. In another example, the lignin can have a MW of about 500 to about 30,000, about 1,000 to about 15,000, about 800 to about 6,000, about 2,000 to about 12,000, about 400 to about 10,000, or about 600 to about 8,000. In another example, the MW of the lignin can be about 600 to about 4,500, about 350 to about 1,100, about 750 to about 2,500, about 950 to about 3,100, about 1,500 to about 3,400, or about 1,800 to about 4,200.

The liquors from which the lignin can be recovered can also include one or more other constituents in addition to the lignin. For example, in the sulfite pulping process, the spent sulfite liquor can include lignosulfonates that can be present as salts of cations, such as magnesium, calcium, ammonium, sodium, potassium, and/or other cations. The spent sulfite liquor solids can include about 40 wt % to about 65 wt % lignosulfonates with the remainder being carbohydrates and other organic and inorganic constituents dissolved in the liquor. Lignin products produced by other pulping processes can also include other materials such as carbohydrates, degradation products of carbohydrates, and resinous materials which are separated from the cellulosic materials with the lignin. It should be noted that it is not necessary to separate the lignin from the other constituents that can be present.

Suitable lignin material can include, but is not limited to, lignin in its native or natural state, e.g., non-modified or unaltered lignin, lignosulfonates, or any combination or mixture thereof. Suitable lignosulfonates can include, but are not limited to, ammonium lignosulfonate, sodium lignosulfonate, calcium lignosulfonate, magnesium lignosulfonate, or any combination or mixture thereof.

Suitable processes for isolating or otherwise separating lignin or lignin containing products form wood, plant, vegetable, or other lignin containing matter can include those discussed and described in U.S. Pat. Nos. 1,856,567; 2,525,433; 2,680,113; 2,690,973; 3,094,515; 3,158,520; 3,503,762; 3,585,104; 3,726,850; 3,769,272; 3,841,887; 4,100,016; 4,131,564; 4,184,845; 4,308,203; 4,355,996; 4,470,876; 4,740,591; and 4,764,596; U.S. Patent Application Publication No.: 2011/0294991; and WO Publication Nos. WO1992/018557A1, WO1993/021260A2; WO1994/024192A1; WO2005/062800A2; WO2006/031 175 A1; and WO2011/150508. Commercially available lignin can include, but is not limited to, lignosulfonates available from Tembec (Canada).

As used herein, the term "tannin" refers to both hydrolyzable tannins and condensed tannins. As such, the compound having at least two hydrogen atoms that are abstractable in the presence of hydroxyl radicals can be or include hydrolyzable tannins, condensed tannins, or a combination of hydrolyzable tannins and condensed tannins. Illustrative genera of shrubs and/or trees from which suitable tannins can be derived can include, but are not limited to, *Acacia, Castanea, Vachellia, Senegalia, Terminalia, Phyllanthus, Caesalpinia, Quercus, Schinopsis, Tsuga, Rhus, Juglans, Carya*, and *Pinus*, or any mixture thereof. In another example, genera from which suitable tannins can be derived can include, but are not limited to, *Schinopsis, Acacia*, or a combination thereof. In another example, genera from which suitable tannins can be derived can include, but are not limited to, *Pinus, Carya*, or a combination thereof.

Hydrolyzable tannins are mixtures of simple phenols such as pyrogallol and ellagic acid and of esters of a sugar, e.g., glucose, with gallic and digallic acids. Illustrative hydrolyzable tannins can include, but are not limited to, extracts recovered from *Castanea sativa*, (e.g., chestnut), *Terminalia* and *Phyllantus* (e.g., myrabalans tree species), *Caesalpinia coriaria* (e.g., divi-divi), *Caesalpinia spinosa*, (e.g., tara), algarobilla, valonea, and *Quercus* (e.g., oak). Condensed tannins are polymers formed by the condensation of flavans. Condensed tannins can be linear or branched molecules. Illustrative condensed tannins can include, but are not limited to, *Acacia mearnsii* (e.g., wattle or mimosa bark extract), *Schinopsis* (e.g., quebracho wood extract), *Tsuga* (e.g., hemlock bark extract), *Rhus* (e.g., sumac extract), *Juglans* (e.g., walnut), *Carya illinoinensis* (e.g., pecan), and *Pinus* (e.g., *Radiata* pine, Maritime pine, bark extract species).

The condensed tannins typically include about 70 wt % to about 80 wt % active phenolic ingredients (the "tannin fraction") and the remaining ingredients (the "non-tannin fraction") typically include, but are not limited to, carbohydrates, hydrocolloid gums, and amino and/or imino acid fractions. The condensed tannins can be used as recovered or extracted from the organic matter or the condensed tannins can be purified, e.g., about 95 wt % or greater active phenolic ingredients. Hydrolyzable tannins and condensed tannins can be extracted from the starting material, e.g., trees and/or shrubs, using well established processes. A more detailed discussion of tannins is discussed and described in the *Handbook of Adhesive Technology*, Second Edition, CRC Press, 2003, chapter 27, "Natural Phenolic Adhesives I: Tannin," and in *Monomers, Polymers and Composites from Renewable Resources*, Elsevier, 2008, chapter 8, "Tannins: Major Sources, Properties and Applications".

The condensed tannins can be classified or grouped into one of two main categories, namely, those containing a resorcinol unit and those containing a phloroglucinol unit. Illustrative tannins that include the resorcinol unit include, but are not limited to, black wattle tannins and quebracho tannins. The resorcinol unit can be represented by Formula I below.

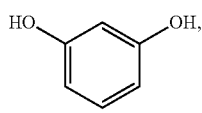

Formula I

The resorcinol group is shown within the box overlaying the unit structure of black wattle and quebracho tannins in Formula II below. For simplicity, the structure of black wattle and quebracho tannins is represented by their flavonoid unit structure.

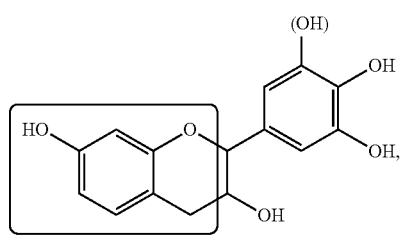

Formula II

Illustrative tannins that include the phloroglucinol unit include, but are not limited to, pecan tannins and pine tannins. The phloroglucinol unit can be represented by Formula III below.

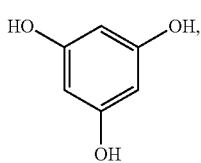

Formula III

The phloroglucinol unit is shown within the box overlaying the unit structure of pecan and pine tannins in Formula IV below. For simplicity, the structure of pecan and pine tannins is represented by their flavonoid unit structure.

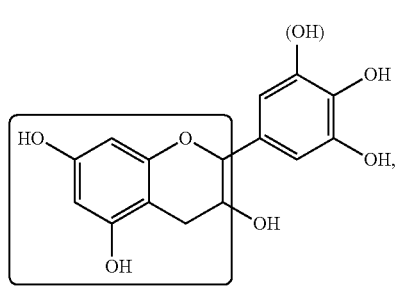

Formula IV

Phloroglucinol is known for higher reactivity than resorcinol. As such, tannins that include the phloroglucinol unit are greater reactive than tannins that include the resorcinol unit.

If the binder composition includes a mixture of hydrolyzable tannins and condensed tannins any ratio with respect to one another can be used. For example, a binder composition that includes both hydrolyzable tannins and condensed tannins can have a concentration of condensed tannins of about 1 wt % to about 99 wt %, based on the combined weight of the hydrolyzable tannins and the condensed tannins. In another example, an binder composition that includes both hydrolyzable tannins and condensed tannins can have a concentration of condensed tannins of about 50 wt % or greater, about 55 wt % or greater, about 60 wt % or greater, about 70 wt % or greater, about 75 wt % or greater, about 80 wt % or greater, about 85 wt % or greater, about 90 wt % or greater, about 95 wt % or greater, or about 97 wt %, based on the combined weight of the hydrolyzable tannins and the condensed tannins.

If the binder composition includes two or more different tannins, the two or more tannins can have a resorcinol unit and/or a phloroglucinol unit. For example, the binder composition can include two different tannins that each can include resorcinol units, e.g., quebracho tannins and black wattle tannins. In another example, the binder composition can include two different tannins, where a first tannin includes a resorcinol unit, e.g., black wattle tannin, and a second tannin includes a phloroglucinol unit, e.g., pine tannin. In another example, the binder composition can include two different tannins that each can independently include phloroglucinol units, e.g., pine tannins and pecan tannins.

The tannins can have an acidic pH. For example, the pH of the tannins can be about 3, about 3.5, or about 4 to about 5, about 5.5, about 6, or about 6.5. The tannins can have resorcinol and/or phloroglucinol functional groups. Suitable, commercially available tannins can include, but are not limited to, black wattle tannin, quebracho tannin, hemlock tannin, sumac tannins, pecan tannin, mimosa tannin, pine tannins, or any mixture thereof.

The novolac resin can be produced by reacting a phenolic component or compound with an aldehyde component or aldehyde compounds in the presence of an acid catalyst. The phenolic component of the novolac resin can include a variety of substituted phenolic compounds, unsubstituted phenolic compounds, or any combination of substituted and/or unsubstituted phenolic compounds. For example, the phenolic component can be mono-hydroxy benzene (phenol). Examples of substituted phenolic components can include, but are not limited to, alkyl-substituted phenols, such as the cresols and xylenols; cycloalkyl-substituted phenols, such as cyclohexyl phenol; alkenyl-substituted phenols; aryl-substituted phenols, such as p-phenyl phenol; alkoxy-substituted phenols, such as 3,5-dimethyoxyphenol; aryloxy phenols, such as p-phenoxy phenol; halogen-substituted phenols, such as p-chlorophenol, isomers thereof, or derivatives thereof. Specific examples of suitable phenolic component or compound used in preparing and incorporated in a novolac resin can include, but are not limited to, bisphenol A, bisphenol F, catechol, resorcinol, hydroquinone, o-cresol, m-cresol, p-cresol, 2,6-xylenol, 2,5-xylenol, 2,4-xylenol, 2,3-xylenol, 3,5-xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-phenol, 3,5-dimethoxy phenol, 3,4,5-trimethoxy phenol, p-ethoxy phenol, p-butoxy phenol, 3-methyl-4-methoxy phenol, p-phenoxy phenol, naphthol, anthranol, substituted derivatives thereof, isomers thereof, or any mixture thereof. In one example, about 80 wt % or greater, about 90 wt % or greater, or about 95 wt % or greater of the phenolic component includes phenol (mono-hydroxy benzene).

Illustrative aldehyde compounds can include the so-called masked aldehydes or aldehyde equivalents, such as acetals or hemiacetals. Suitable aldehydes can be represented by the general formula R'CHO, where R' can be a hydrogen or a hydrocarbon radical generally having 1 carbon atom to about 8 carbon atoms. Specific examples of suitable aldehyde compounds can include, but are not limited to, formaldehyde, acetaldehyde, propionaldehyde, butyraldehyde, furfuraldehyde, benzaldehyde, or any mixture thereof. As used herein, the term "formaldehyde" can refer to formaldehyde, formaldehyde derivatives, other aldehydes, or combinations thereof. In one example, the aldehyde component can be formaldehyde. One or more difunctional aldehydes can also be used to produce the novolac resin, and could advantageously be used to introduce cross-links ultimately into the at least partially cured novolac resin.

The aldehyde can be used in many forms such as solid, liquid, and/or gas. Considering formaldehyde in particular, the formaldehyde can be or include paraform (solid, polymerized formaldehyde), formalin solutions (aqueous solutions of formaldehyde, sometimes with methanol, in about 37 wt %, about 44 wt %, or about 50 wt % formaldehyde concentrations), urea-formaldehyde concentrate ("UFC"), and/or formaldehyde gas in lieu of or in addition to other forms of formaldehyde can also be used. In another example, the aldehyde can be or include a pre-reacted urea-formaldehyde mixture having a urea to formaldehyde weight ratio of about 1:2 to about 1:3.

A molar ratio of formaldehyde to phenol used to produce the novolac resin can be about 0.5 to about 0.95 or about 0.7 to about 0.85. The reaction between the phenol and the formaldehyde to produce the novolac resin can be carried out in the presence of an acid catalyst under acidic conditions. Suitable acid catalysts can include, but are not limited to, oxalic acid, sulfuric acid, p-toluene sulfuric acid, hydrochloric acid, salicylic acid, mineral acids and salts thereof, or any mixture thereof. Mixed catalyst systems, such as ZnOAc/oxalic acid and other divalent metal compounds, e.g., acetates, can be used to prepare "high-ortho" novolac resins. Divalent metal compounds can include calcium, magnesium, zinc, cadmium, lead, copper, cobalt, nickel, and iron. In some examples, catalysts can include oxalic acid, sulfuric acid, p-toluenesulfonic acid, or ZnOAc/oxalic acid. In one specific example, the catalyst can be oxalic acid or ZnOAc/oxalic acid.

The amount of acid catalyst used to produce the novolac resin can be sufficient to catalyze the reaction between the phenol and formaldehyde to produce the novolac resin. The phenol/formaldehyde reaction can be conducted in about 1 hr to about 6 hr, e.g., about 2 hr to about 4 hr. The phenol/formaldehyde reaction can be carried out at a temperature of about 80° C. to about 100° C., e.g., about 95° C. to about 100° C. The reaction can be carried out at atmospheric pressure, although increased pressure can be utilized to permit the application of higher temperatures and, therefore, faster reaction rates and accordingly shorter reaction times.

The novolac resin can be treated to remove water and/or other volatile organic materials by heating, such as by distillation. After this treatment, the free phenol can be about 0.001% to about 2%, or about 0.001% to about 0.5%. Distillation of the resulting novolac resin can be performed at atmospheric pressure by heating to about 140° C., and then under a vacuum until the resin reaches a temperature of about 180° C. to about 220° C. Other suitable methods for treating the resin via heat can include thin-film evaporators. The resulting molten novolac resin can be cooled to a temperature below about 100° C.

In some examples, the novolac resin can be neutralized. Neutralization of the novolac resin can be accomplished by the addition of one or more bases or base compounds, such as sodium hydroxide and/or potassium hydroxide, or its equivalent. The base compound can be added in an amount sufficient to raise the pH of the novolac resin to about 5 to about 9, e.g., about 6 to about 8. Typically, about 10 wt % to about 30 wt % of water, based on the total resin solids, can be added. Suitable novolac resins and inverted novolac resins can be as discussed and described in U.S. Pat. No. 5,670,571 and U.S. Patent Application Publication No. 2008/0280787.

The modified phenol formaldehyde resin can be or include ARYLZENE®, which can be represented by the general Formula V:

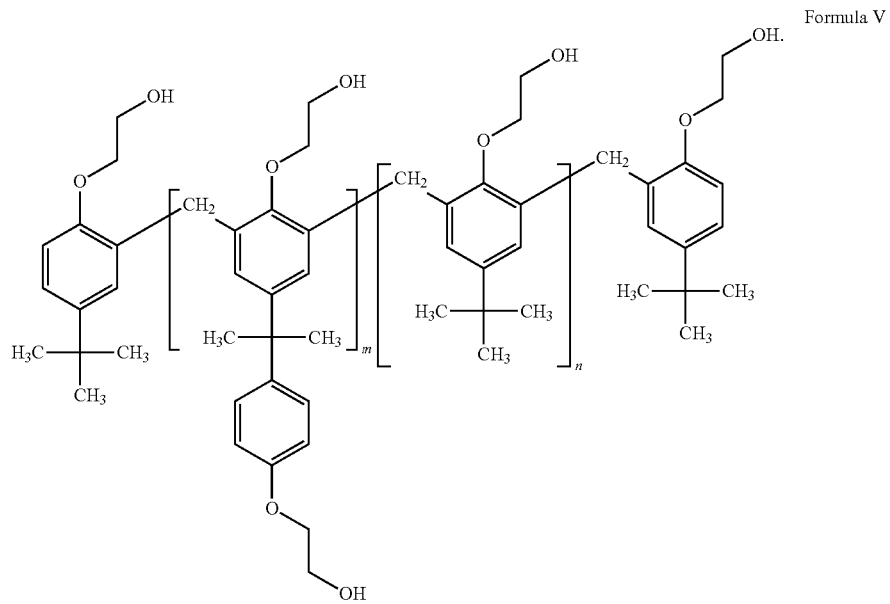

Formula V where n = 3 and 0.8 < m < 1.5

Other illustrative modified phenol formaldehyde resins can be or include those discussed and described in U.S. Pat. Nos. 5,674,970; 5,739,259; 5,756,642; 5,756,655; 5,770,750; 5,773,552; 5,837,798; 5,889,137; 6,166,151; 6,291,077; 6,399,740; and 6,569,953.

If the bisphenol can be present as or as a component of the polyphenolic material, any polyphenolic bisphenol compound can be used. Illustrative bisphenols can include, but are not limited to, bisphenol A, bisphenol B, bisphenol C, bisphenol E, bisphenol F, bisphenol G, or any mixture thereof.

Humic acid can be represented by the general Formula VI:

where "R" can be hydrogen or any organic or other chemical group.

One or more of the polyphenolic materials can be modified with one or more compounds having one or more carbon-carbon double bonds and one or more reactive functional groups. For example, the lignocellulose binder mixture can include one or more polyphenolic materials modified by at least partially reacting with one or more unsaturated monomers having one or more reactive functional groups. Any suitable compounds having one or more carbon-carbon double bonds and one or more reactive functional groups or combination of compounds having one

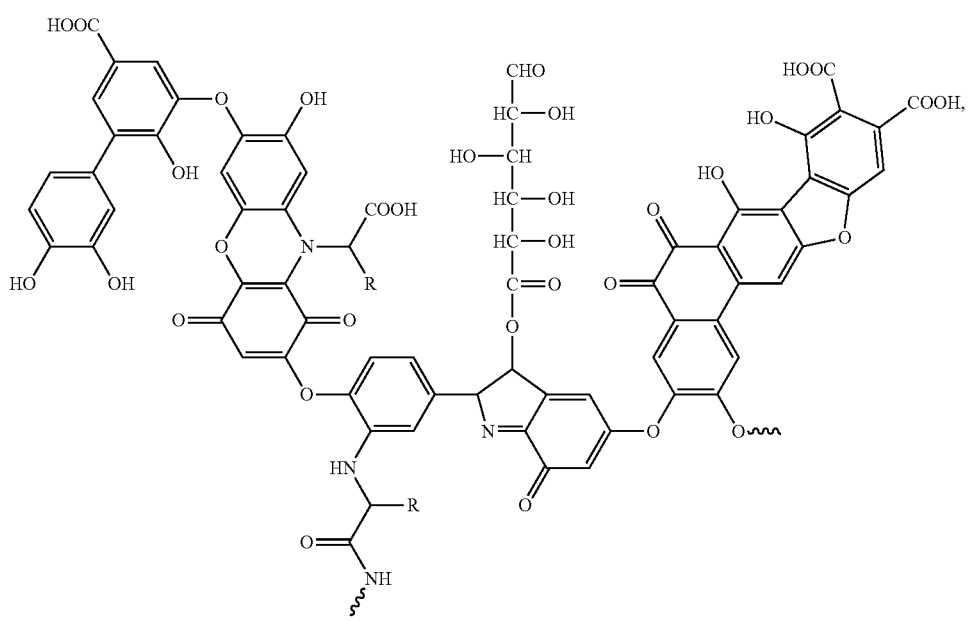

Formula VI or more carbon-carbon double bonds and one or more reactive functional groups can be used to produce the modified polyphenolic materials. The compounds having one or more carbon-carbon double bonds and one or more reactive functional groups can be nonionic. Illustrative compounds having one or more carbon-carbon double bonds and one or more reactive functional groups can include, but are not limited to, one or more unsaturated glycidyl ethers, one or more unsaturated glycidyl esters, one or more unsaturated mono-epoxides, one or more unsaturated methylol compounds, maleic anhydride, or any mixture thereof.

Illustrative unsaturated glycidyl ethers can be represented by general Formula VII:

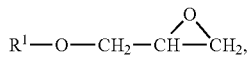

Formula VII where $R^1$ can be an ethylenically unsaturated radical such as vinyl, allyl, or alkenyl. Suitable glycidyl ethers can include, but are not limited to, vinyl glycidyl ether, isopropenyl glycidyl ether, oleyl glycidyl ether, allyl glycidyl ether, p-vinylbenzyl glycidyl ether, o-allyl phenyl glycidyl ether, butenyl glycidyl ether, 4-vinylcyclohexyl glycidyl ether, abietylglycidyl ether, cyclohexeneylmethyl glycidyl ether, methallyl glycidyl ether, or any mixture thereof.

Illustrative unsaturated glycidyl esters can be represented by general Formula VIII:

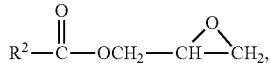

Formula VIII where $R^2$ can be an unsaturated, unsubstituted alkyl radical having 2 carbon atoms to about 19 carbon atoms. Suitable glycidyl esters can include, but are not limited to, glycidyl methacrylate, glycidyl acrylate, glycidyl crotonate, glycidyl oleate, diglycidyl maleate, diglycidyl fumarate, or any mixture thereof.

Illustrative unsaturated mono-epoxides can include, but are not limited to, linear or cycloaliphatic epoxy compounds, where the unsaturation is terminal. Suitable unsaturated mono-epoxides can be represented by general Formulas IXa and IXb:

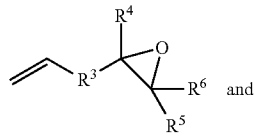

Formula IXa and

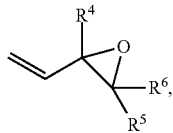

Formula IXb where $R^3$ can be an alkylene, an alkanediyl, or an alkanetriyl, optionally containing alkyl pendant groups; $R^4$, $R^5$, and $R^6$ can independently be hydrogen, alkyl straight, branched, or cyclic, or any two of $R^3$, $R^4$, $R^5$, or $R^6$ can be alkylene, alkanediyl, or alkanetriyl, and/or combined to form a cyclic ring of 4 carbon atoms to about 12 carbon atoms, optionally containing alkyl pendants; and the number of carbon atoms in $R^3$, $R^4$, $R^5$, and $R^6$ can be such that the total number of carbon atoms in the epoxide can be 4 to about 50. Illustrative alkylenes that can be used as $R^6$, $R^7$, $R^8$, or $R^9$ can include, but are not limited to, methylene, ethylene, propylene, or butylene. In some examples, $R^3$ and $R^5$, $R^3$ and $R^6$, $R^4$ and $R^5$, or $R^4$ and $R^6$ can form a cyclic ring of 4 carbon atoms to about 12 carbon atoms, such as, for example, cyclopentene, cyclohexene, cycloheptene, or cyclooctene. Suitable unsaturated mono-epoxides can include, but are not limited to, 4-vinyl cyclohexene oxide, 1-methyl-4-isopropenyl cyclohexene oxide, butadiene monoxide, any mixture thereof, or any mixture thereof.

Illustrative unsaturated methylol compounds can be represented by the general Formula X:

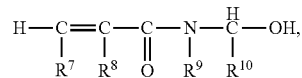

Formula X where $R^7$, $R^8$, $R^9$, and $R^{10}$ can independently be hydrogen or a hydrocarbyl group, e.g., an alkyl group, containing 1 carbon atom to about 6 carbon atoms. For example, an alkyl group can include 1 carbon atom to about 4 carbon atoms. In at least one example, $R^7$, $R^8$, $R^9$, and $R^{10}$ can each independently be methyl or hydrogen. Suitable unsaturated methylol compounds can include, but are not limited to, N-methylol acrylamide, N-methylol methacrylamide, N-methylol crotonamide, or any mixture thereof. The N-methylol ethylenically unsaturated amide can be in the form of an aqueous solution.

In at least one example, the modified polyphenolic materials can be completely free, essentially free, or substantially free of any anionic monomers. For example, the modified polyphenolic materials can contain less than 3 wt %, less than 2.5 wt %, less than 2 wt %, less than 1.5 wt %, less than 1 wt %, less than 0.7 wt %, less than 0.5 wt %, less than 0.3 wt %, less than 0.1 wt %, less than 0.05 wt %, or less than 0.01 wt % anionic monomers. In at least one example, the modified polyphenolic materials can be free or essentially free of any ionic monomers. For example, the modified polyphenolic materials can contain less than 3 wt %, less than 2.5 wt %, less than 2 wt %, less than 1.5 wt %, less than 1 wt %, less than 0.7 wt %, less than 0.5 wt %, less than 0.3 wt %, less than 0.1 wt %, less than 0.05 wt %, or less than 0.01 wt % ionic monomers. In at least one other example the modified polyphenolic materials can be free or essentially free of any anionic and ionic monomers. For example, the modified polyphenolic materials can contain less than 3 wt %, less than 2.5 wt %, less than 2 wt %, less than 1.5 wt %, less than 1 wt %, less than 0.7 wt %, less than 0.5 wt %, less than 0.3 wt %, less than 0.1 wt %, less than 0.05 wt %, or less than 0.01 wt % anionic and ionic monomers. As used herein, the terms "essentially free of anionic monomers" and "essentially free of ionic monomers" means the modified polyphenolic materials does not include any intentionally added anionic monomers or ionic monomers, respectively, therefore, the modified polyphenolic materials may include anionic monomers and/or ionic monomers present as an impurity. Suitable modified polyphenolic materials and methods for making same can be as discussed and described in U.S. Patent Application Publication No. 2013/0287993.

If two or more polyphenolic materials are present, the two or more polyphenolic materials can be present in any amount with respect to one another. For example, if the polyphenolic material includes a first polyphenolic material and a second polyphenolic material, the first polyphenolic material can be present in an amount of about 1 wt % to about 99 wt % and, conversely the second polyphenolic material can be present in an amount of about 99 wt % to about 1 wt %, based on the combined weight of the polyphenolic material. In another example, the amount of the first polyphenolic material can be about 5 wt %, about 10 wt %, about 15 wt %, about 20 wt %, about 25 wt % about 30 wt %, about 35 wt %, about 40 wt %, or about 45 wt % to about 60 wt %, about 65 wt %, about 70 wt %, about 75 wt %, about 80 wt %, about 85 wt %, about 90 wt %, or about 95 wt %, based on the total weight of the first and second polyphenolic materials.

In some examples, the unsaturated compound can include, but is not limited to, dicyclopentadiene (DCPD), 4-vinylcyclohexene, one or more vinyl ethers, one or more allyl ethers, diallyl phthalate, allyl crotonate, allyl cinamate, allyl methacrylate, vinyl methacrylate, ethylene glycol diacrylate, ethylene glycol dimethacrylate, diethylene glycol diacrylate, diethylene glycol dimethacrylate, trimethylepropane triacrylate (TMPTA), poly(ethylene glycol)diacrylate, poly(ethylene glycol)dimethacrylate, trimethylolpropane triacrylate (TMPTA), pentaerythritol tetraacrylate, pentaerythritol triacrylate, polyacrylate, one or more conjugated dienes, one or more terpenes, one or more drying oils having an iodine number of about 115 or greater, one or more unsaturated prepolymers, one or more polyesters with one or more incorporated vinyl unsaturations, styrene-butadiene rubber (SBR), one or more starches having at least one unsaturated and polymerizable olefinic group, polymers derived from ring-opening polymerization of allyl caprolactone, a product or products formed by reacting one or more polyamidoamines and one or more unsaturated glycidyl ethers, or any mixture thereof.

In some examples, the unsaturated compound can have a double bond equivalent molecular weight of about 33, about 50, about 100, about 150, about 200, about 500, about 1,000, about 5,000, about 10,000, or about 15,000 to about 50,000, about 75,000, about 100,000, about 150,000, about 200,000, or about 250,000. In some examples, the unsaturated compound can have a double bond equivalent molecular weight of at least 33, at least 40, at least 45, at least 50, at least 75, at least 100, at least 200, at least 300, at least 400, at least 500, at least 1,000, at least 2,500, at least 5,000, at least 10,000, at least 20,000, at least 30,000, at least 40,000, at least 50,000, at least 60,000, at least 70,000, at least 80,000, at least 90,000, at least 100,000, at least 110,000, at least 120,000, at least 130,000, at least 140,000, or at least 150,000 to about 175,000, about 200,000, about 225,000, or about 250,000.

As used herein, the double bond equivalent molecular weight can be calculated by dividing the molecular weight of the unsaturated compound by the number of carbon-carbon double bonds the unsaturated compound contains. For example, if the unsaturated compound is cyclopentadiene, which has a molecular weight of 66.1 g/mol and two carbon-carbon double bonds, the double bond equivalent molecular weight is 33.05 (66.1 divided by 2). Accordingly, as used herein, the term "unsaturated compound" includes compounds that can be considered a monomer or discrete molecules. In another example, if the unsaturated compound is trimethylolpropane triacrylate (TMPTA), which has a molecular weight of 296.32 g/mol and 3 carbon-carbon double bonds, the double bond equivalent molecular weight 98.8.

In some examples, the unsaturated compound can have a MW of about 200, about 250, about 300, about 350, about 400, about 450, about 500, about 550, about 600, or about 650 to about 1,000, about 1,500, about 2,000, about 2,500, about 3,000, about 3,500, about 4,000, about 4,500, or about 5,000. For example, the unsaturated compound can have a MW of about 300 to about 3,000, about 330 to about 770, about 380 to about 930, about 470 to about 1,150, about 700 to about 1,800, about 800 to about 2,200, about 1,200 to about 2,000, about 400 to about 2,800, about 500 to about 2,700, about 600 to about 2,600, or about 700 to about 2,500. In some examples, the unsaturated compound can have a MW of at least 300, at least 325, at least 350, at least 375, at least 400, at least 425, at least 450, at least 475, at least 500, at least 525, at least 550, at least 575, at least 600, at least 625, at least 650, at least 675, at least 700, at least 750, at least 775, at least 800, at least 825, at least 850, at least 875, at least 900, at least 925, at least 950, at least 975, or at least 1,000.

Illustrative vinyl aromatic compounds can include, but are not limited to, 2-allylphenol, 4-allylphenol, and a mixture thereof. Illustrative vinyl ethers can include, but are not limited to, triethyleneglycol divinyl ether, divinyl ether, or a mixture thereof. Illustrative allyl ethers can include, but are not limited to, diallyl ether, trimethylolpropane diallyl ether, triallyl cyanurate, or any mixture thereof. Illustrative conjugated dienes can include, but are not limited to, 1,3-butadiene, 2,3-dimethylbutadiene, 2-methyl-1,3-butadiene (isoprene), 1,3-pentadiene (piperylene), cyclopentadiene, 2-chloro-1,3-butadiene (chloroprene), or any mixture thereof. Illustrative terpenes can include, but are not limited to, sesquiterpenes, or any mixture thereof. Illustrative sesquiterpenes can include, but are not limited to, farnesene, or any mixture thereof. Illustrative one or more drying oils having an iodine number of about 115 or greater can include, but are not limited to, linseed oil, soybean oil, sunflower oil, tung oil, grape seed oil, wheat germ oil, corn oil, or any mixture thereof. In some examples, the drying oil can have an iodine number of about 115 to about 180 or greater. Illustrative unsaturated prepolymers can include, but are not limited to, unsaturated polyester prepolymers, unsaturated polyether prepolymers, unsaturated polyamide prepolymers, unsaturated polyurethane prepolymers, or any mixture thereof. Illustrative polyesters with one or more incorporated vinyl unsaturations can include, but are not limited to, methacrylate, acrylate modified or terminated polyesters, or any mixture thereof.

As noted above, the α,β-unsaturated carbonyl compound can be, but is not limited to, an α,β-unsaturated aldehyde (e.g., an enal), an α,β-unsaturated ketone (e.g., an enone), an α,β-unsaturated carboxylic acid, an α,β-unsaturated ester, an α,β-unsaturated amide, an α,β-unsaturated acyl halide, an α,β-unsaturated acid anhydride, or an α,β-unsaturated imide. Illustrative α,β-unsaturated carbonyl aldehydes can include, but are not limited to, crotonaldehyde, 3-methylcrotonaldehyde, methacrolein, tiglic aldehyde, isomers thereof, or any mixture thereof. Illustrative α,β-unsaturated ketones can include, but are not limited to, methyl vinyl ketone, ethyl vinyl ketone, isomers thereof, or any mixture thereof. Illustrative α,β-unsaturated carboxylic acids can include, but are not limited to, maleic acid, itaconic acid, fumaric acid, glutaconic acid, citraconic acid, traumatic acid, muconic acid, aconitic acid, isomers thereof or any mixture thereof. Illustrative α,β-unsaturated esters can include, but are not limited to, esters of maleic acid, itaconic acid, fumaric acid, glutaconic acid, citraconic acid, traumatic acid, muconic acid, aconitic acid, isomers thereof, or any mixture thereof. An illustrative α,β-unsaturated amide can include, but are not limited to, acrylamide. Illustrative α,β-unsaturated acyl halides can include, but are not limited to, acryloyl chloride, methacryloyl chloride, crotonoyl chloride, fumaryl chloride, itaconyl chloride, sorbic chloride, isomers thereof, or any mixture thereof. An illustrative α,β-unsaturated acid anhydride can include, but is not limited to, maleic anhydride, an isomer thereof, or a mixture thereof. An illustrative α,β-unsaturated imide can include, but is not limited to, maleimide, an isomer thereof, or a mixture thereof.

Other compounds having one or more pi-bonds (e.g., unsaturated bonds) that is capable of going through a radical chain reaction mechanism, but is also conjugated with an aromatic moiety, can include, but are not limited to, vinyl aromatics, such as styrene, methylstyrenes, vinyl toluene, vinyl naphthalene, divinylbenzene (DVB), and vinylpyridine; methylstyrenes such as α-methylstyrene, trans-β-methylstyrene; and any mixture thereof.

Illustrative unsaturated starch compounds having at least one unsaturated and polymerizable olefinic group can be represented by Formula XI below.

Formuola XI where $R^{11}$ can be hydrogen or an alkyl group. Suitable starches can include, but are not limited to, maize or corn, waxy maize, high amylose maize, potato, tapioca, and wheat starch. Other starches, such as genetically engineered starches, can include high amylose potato and potato amylopectin starches. Suitable methods for preparing unsaturated starch compounds having at least one unsaturated and polymerizable olefinic group can include those discussed and described in U.S. Pat. No. 2,668,156.

The unsaturated prepolymer can include one or more monounsaturated prepolymers, one or more polyunsaturated prepolymers, or any mixture thereof. In some examples, suitable polyunsaturated prepolymers can include at least 2 sites of unsaturation, at least 3 sites of unsaturation, at least 4 sites of unsaturation, at least 5 sites of unsaturation, at least 6 sites of unsaturation, or more. In some examples, the unsaturated prepolymer can be unsaturated polyester prepolymers, unsaturated polyether prepolymers, unsaturated polyamide prepolymers, unsaturated polyurethane prepolymers, or any mixture thereof.

The unsaturated polyester prepolymer can be synthesized or produced by reacting one or more polyacids and one or more polyols with one another. For example, the unsaturated prepolymer can be produced via monoester formation. In another example, the unsaturated polyester prepolymer can be produced by reacting the polyacid and the polyol via a condensation reaction. As used herein, the term "polyacid" refers to compounds having at least two reactive acid groups per molecule. The acid functionality can be a carboxylic acid, a sulfonic acid, or a combination thereof. The term "polyacid" can also refer to acid anhydrides, e.g., maleic anhydride. The term "polyacid" can also refer to compounds containing at least one acid group per molecule and at least one acid anhydride group per molecule, e.g., a maleated fatty acid. As used herein, the term "polyol" refers to compounds that contain two or more hydroxyl functional groups.

In some examples, the one or more sites of unsaturation in the unsaturated polyester prepolymer can be directly introduced from the polyacid and/or the polyol, e.g., at least one of the polyacid and the polyol can include one or more sites of unsaturation. Therefore, for example, the unsaturated polyester prepolymer can be produced by reacting one or more unsaturated polyacids with one or more saturated polyols, reacting one or more unsaturated polyols with one or more saturated polyacids, and/or by reacting one or more unsaturated polyacids with one or more unsaturated polyols. In some examples, the sites of unsaturation in the unsaturated polyester prepolymer can be appended to an initial prepolymer formed by reacting the polyacid and the polyol with one or more unsaturated compounds. In another example, the unsaturation sites of the unsaturated polyester prepolymer can be introduced via at least one of the polyol and the poly acid, and an additional unsaturated compound. Illustrative additional unsaturated compounds can include, but are not limited to, unsaturated alcohols, unsaturated acids, unsaturated epoxides, or any mixture thereof.

The polyacid and polyol components can be mixed, blended, or otherwise combined with one another to produce a reaction mixture. The polyacid and polyol can be reacted under conditions sufficient to substantially react the primary hydroxyl groups of the polyol with the polyacid, but insufficient to cause reaction of the secondary hydroxyl groups of the polyol with the polyacid to a substantial extent. As used herein, the phrase "substantially react the primary hydroxyl groups of the polyol with the polyacid" means that at least 90% of the primary hydroxyl groups of the polyol are reacted with the polyacid. As used herein, the phrase "insufficient to cause reaction of the secondary hydroxyl groups of the polyol with the polyacid to a substantial extent" means that less than 10% of the secondary hydroxyl groups of the polyol are reacted with the polyacid. For example, the polyacid and the polyol can be combined in a reaction vessel or container and heated to a temperature of about 50° C., about 60° C., about 70° C., or about 80° C. to about 110° C., about 125° C., about 140° C., or about 155° C. In another example, the polyacid and the polyol can be heated to a temperature of about 60° C. to about 130° C., about 80° C. to about 115° C., about 100° C. to about 150° C., or about 75° C. to about 135° C. The polyacid and the polyol can be reacted with one another for a time of about 10 min, about 30 min, about 1 hr, or about 2 hr to about 4 hr, about 6 hr, about 8 hr, or about 10 hr.

The progress of the reaction between the polyacid and the polyol can be monitored via any suitable method. One method for monitoring the extent of the reaction between the polyacid and the polyol can be through the use of infrared spectroscopy. For example, infrared spectroscopy can detect the presence of any unreacted polyacid. In one example, the reaction between the polyacid and the polyol can be carried out until the presence of the polyacid is no longer detected. It should be noted, however, that the unsaturated polyester prepolymer can include unreacted polyacid and/or unreacted polyol.

The polyacid and the polyol can be combined with one another in any predetermined ratio. For example, the polyol and the polyacid can be combined with one another at a molar ratio of about 1:5, about 1:4, or about 1:2 to about 1:1, about 2:1, about 4:1, or about 6:1. In at least one example, the amount of the polyacid combined with the polyol can be sufficient to provide a ratio of reactive acid and/or anhydride groups to hydroxyl groups of about 1:1 to about 2:1. In some examples, for each hydroxyl group present in the polyol about 1 acid group, about 2 acid groups, or about 3 acid groups can be present in the lignocellulose binder mixture of the polyol and the polyacid.

The polyacid can be or include, but is not limited to, one or more unsaturated and/or saturated aliphatic polyacids, one or more aromatic polyacids, one or more cyclo-aliphatic polyacids, one or more acid anhydrides, or any mixture thereof. Suitable unsaturated aliphatic diacids and saturated aliphatic diacids can include 2 carbon atoms to about 12 carbon atoms, 3 carbon atoms to about 10 carbon atoms, or 4 carbon atoms to about 8 carbon atoms. Illustrative unsaturated aliphatic diacids can include, but are not limited to, maleic acid, itaconic acid, fumaric acid, glutaconic acid, citraconic acid, traumatic acid, muconic acid, aconitic acid, or any mixture thereof. Illustrative saturated aliphatic diacids can include, but are not limited to, oxalic acid, malonic acid, succinic acid, glutaric acid, adipic acid, pimelic acid, suberic acid, azelaic acid, sebacic acid, or any combination or mixture thereof. Illustrative aromatic diacids can include, but are not limited to, phthalic acid, isophthalic acid, terephthalic acid, or any combination or mixture thereof. Illustrative cyclo-aliphatic diacids can include, but are not limited to, cyclobutanedicarboxylic acid, cyclopentanedicarboxylic acid, cyclohexanedicarboxylic acid, isomers thereof, or any combination or mixture thereof. Illustrative acid anhydrides can include, but are not limited to, phthalic anhydride, mellitic anhydride, pyromellitic anhydride, maleic anhydride, or any combination or mixture thereof. In some examples, the polyacid can also include one or more unsaturated fatty acids reacted with any one or more of the polyacids discussed and described above. For example, in some specific examples, the polyacid can be or include the Alder-Ene reaction product between one or more unsaturated fatty acids and maleic anhydride. Therefore, for example, the polyacid can be or include one or more maleated fatty acids.

Illustrative saturated polyols can include, but are not limited to, ethylene glycol, polyglycerol, hyperbranched polyglycerol, diethylene glycol, triethylene glycol, polyethylene oxide (hydroxy terminated), glycerol, pentaerythritol, trimethylolpropane, diethanolamine, triethanolamine, ethyl diethanolamine, methyl diethanolamine, sorbitol, monosaccharides, such as glucose and fructose, disaccharides, such as sucrose, and higher polysaccharides such as starch and reduced and/or modified starches, dextrin, maltodextrin, polyvinyl alcohols, hydroxyethylcellulose, 1,4-cyclohexane diol, or any combination or mixture thereof. Illustrative unsaturated polyols can include, but are not limited to, 2-butene-1,4-diol, hydroxyl-terminated polybutadiene (HTPB) or any combination or mixture thereof.

Illustrative unsaturated alcohols suitable for introducing, appending, or otherwise providing one or more sites of unsaturation in the unsaturated polyester prepolymer can include, but are not limited to, any one or more of the unsaturated polyols discussed and described above, allylic alcohols, unsaturated alcohols obtained via metathesis reaction of hydroxyl-substituted unsaturated fatty acid or fatty acid esters, or any combination or mixture thereof. The preparation of unsaturated alcohols via metathesis reaction can be as discussed and described in U.S. Pat. No. 7,176, 336. Illustrative unsaturated acids suitable for introducing, appending, or otherwise providing one or more sites of unsaturation in the unsaturated polyester prepolymer can include, but are not limited to, any one or more of the unsaturated polyacids discussed and described above, or any combination or mixture thereof. Suitable unsaturated epoxides suitable for introducing, appending, or otherwise providing one or more sites of unsaturation in the unsaturated polyester prepolymer can include, but are not limited to, allyl glycidyl ether, 3,4-epoxy-1-butene, 1,2-epoxy-5-hexene, any mixture thereof or mixture thereof.

In some examples, one or more catalysts or unsaturated polyester prepolymer catalysts can optionally be present when the polyacid and the polyol are reacted with one another. Suitable catalysts can include, but are not limited to, monobutyltin oxide, dibutyltin oxide, dibutyltin dilaurate, or any mixture thereof. The one or more catalysts, if present, can be present in an amount of about 0.05 wt %, about 0.1 wt %, about 0.5 wt %, or about 1 wt % to about 2 wt %, about 3 wt %, about 4 wt %, or about 5 wt %, based on the combined weight of the polyacid and the polyol.

In some examples, the unsaturated polyester prepolymer can be combined with one or more reactive monomers in lieu of or in addition to the water. Illustrative reactive monomers that can be combined with the unsaturated polyester prepolymer can include, but are not limited to, styrene, methyl styrene, chlorostyrene, vinyl toluene, divinyl benzene, vinyl acetate, acrylic acid, methacrylic acid, lower alkyl esters of acrylic acid, lower alkyl esters of methacrylic acid, diallyl phthalate, vegetable oils, and drying oils, e.g., linseed oil, soybean oil, sunflower oil, tung oil, grape seed oil, wheat germ oil, corn oil, or any mixture thereof. If the unsaturated polyester prepolymer is combined with one or more reactive monomers, the amount of the one or more reactive monomers can be about 1 wt %, about 5 wt %, about 10 wt %, about 15 wt %, or about 20 wt % to about 40 wt %, about 45 wt %, about 50 wt %, about 55 wt %, or about 60 wt %, based on the combined weight of the one or more reactive monomers and the unsaturated polyester prepolymer.

The unsaturated polyamide prepolymers can be produced by reacting one or more polyamines with one or more polyacids. The unsaturated polyamide prepolymers can also be produced by reacting one or more polyamines with one or more esters. In some examples, the one or more sites of unsaturation in the unsaturated polyamide prepolymer can be directly introduced from the polyacid and/or the polyamine, e.g., at least one of the polyacid and the polyamine can include one or more sites of unsaturation. Therefore, for example, the unsaturated polyamide prepolymer can be produced by reacting one or more unsaturated polyacids with one or more saturated polyamines, reacting one or more unsaturated polyamines with one or more saturated polyacids, and/or by reacting one or more unsaturated polyacids with one or more unsaturated polyamines. In some examples, the sites of unsaturation in the unsaturated polyamide prepolymer can be appended to an initial prepolymer formed by reacting the polyacid and the polyamine with one or more unsaturated compounds. In another example, the unsaturation sites of the unsaturated polyamide prepolymer can be introduced via at least one of the polyamine and the poly acid, and an additional unsaturated compound. Illustrative additional unsaturated compounds can include, but are not limited to, unsaturated alcohols, unsaturated acids, unsaturated epoxides, or any mixture thereof.

The polyacid and polyamine components can be mixed, blended, or otherwise combined with one another to produce a reaction mixture. The reaction mixture can be at under conditions sufficient so the polyacid and the polyamine can react to produce the unsaturated polyamide prepolymer. For example, the polyacid and the polyamine can be combined in a reaction vessel or container and heated to a temperature of about 50° C., about 60° C., about 70° C., or about 80° C. to about 110° C., about 125° C., about 140° C., or about 155° C. In another example, the polyacid and the polyamine can be heated to a temperature of about 60° C. to about 130° C., about 80° C. to about 115° C., about 100° C. to about 150° C., or about 75° C. to about 135° C. The polyacid and the polyamine can be reacted with one another for a time of about 10 min, about 30 min, about 1 hr, or about 2 hr to about 4 hr, about 6 hr, about 8 hr, or about 10 hr. Polyamides can also be produced or obtained via transamidation.

The progress of the reaction between the polyacid and the polyamine can be monitored via any suitable method. One method for monitoring the extent of the reaction between the polyacid and the polyamine can be through the use of infrared spectroscopy. For example, infrared spectroscopy can detect the presence of any unreacted polyacid. In one example, the reaction between the polyacid and the polyamine can be carried out until the presence of the polyacid is no longer detected. It should be noted, however, that the unsaturated polyamide prepolymer can include unreacted polyacid and/or unreacted polyamine.

The polyacid and the polyamine can be combined with one another in any predetermined ratio. For example, the polyamine and the polyacid can be combined with one another at a molar ratio of about 1:5, about 1:4, or about 1:2 to about 1:1, about 2:1, about 4:1, or about 6:1. In at least one example, the amount of the polyacid combined with the polyamine can be sufficient to provide a ratio of reactive acid and/or anhydride groups to amine groups of about 1:1 to about 2:1. For example, for each amine group present in the polyamine 1 acid group, 2 acid groups, or 3 acid groups can be present in the lignocellulose binder mixture of the polyamine and the polyacid.

Suitable polyacids can include those discussed and described above or elsewhere herein. Illustrative saturated polyamines can include, but are not limited to, ethylenediamine, propylenediamine, hexamethylenediamine, diethylenetriamine (DETA), triethylenetetramine (TETA), tetraethylenepentamine (TEPA), 1,3-propanediamine, 1,4-butanediamine, hyperbranched polyethyleneimine, or any combination or mixture thereof. Illustrative unsaturated polyamines can include those represented by the following general Formula XII below:

Formula XII

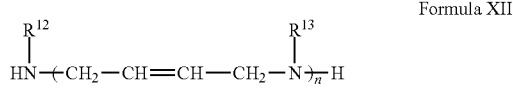

where $R^{12}$ and $R^{13}$ can independently be an organic group having 1 carbon atom to about 24 carbon atoms, e.g., an alkyl group containing 1 carbon atom to about 12 carbon atoms, and n can be an integer of 2 to about 12. Illustrative unsaturated polyamines having Formula XII can be prepared according to the methods discussed and described in U.S. Pat. No. 3,773,833.

The unsaturated polyether prepolymers can be produced by polymerization of allyl glycidyl ether (AGE) to form poly(allyl glycidyl ether) (PAGE). Resulted prepolymer can have pendant allyl groups. Suitable reaction conditions for producing the unsaturated polyurethane prepolymer can include those discussed and described in Lee, B. F. et al., "Poly(allyl Glycidyl Ether)—A Versatile and Functional Polyether Platform," Journal of Polymer Science Part A: Polymer Chemistry, Vol. 49, August 2011, pp. 4498-4504. The copolymerization reaction of AGE with other monomers can be as discussed and described in Sunder, A. et al., "Copolymers of Glycidol and Glycidyl Ethers: Design of Branched Polyether Polyols by Combination of Latent Cyclic $AB_2$ and ABR Monomers," Macromolecules, Vol. 33, September 2000, pp. 7682-7692, and Erberich, M. et al., "Polyglycidols with Two Orthogonal Protective Groups: Preparation, Selective Deprotection, and Functionalization," Macromolecules, Vol. 40, April 2007, pp. 3070-3079.

The unsaturated polyurethane prepolymers can be produced by reacting one or more polyisocyanates with one or more compounds having active hydrogen functionality. Moieties that provide active hydrogen functionality can include, but are not limited to, hydroxyl groups, mercaptan groups, amine groups, and carboxyl groups. In some examples, hydroxyl groups can be used as a compound having active hydrogen functionality.

Suitable polyisocyanates can include, but are not limited to, hexamethylene diisocyanate, toluene diisocyanate (TDI), diphenylmethane diisocyanate (MDI), m-phenylene and p-phenylene diisocyanates, bitolylene diisocyanate, cyclohexane diisocyanate (CHDI), bis(isocyanatomethyl)cyclohexane ($H_6$XDI), dicyclohexylmethane diisocyanate ($H_{12}$MDI), dimer acid diisocyanate (DDI), trimethyl hexamethylene diisocyanate, lysine diisocyanate and its methyl ester, methyl cyclohexane diisocyanate, 1,5-napthalene diisocyanate, xylylene and xylene diisocyanate and methyl derivatives thereof, polymethylene polyphenyl isocyanates, chlorophenylene-2,4-diisocyanate, polyphenylene diisocyanates available commercially as, for example, Mondur MR or Mondur MRS, isophorone diisocyanate (IPDI), hydrogenated methylene diphenyl isocyanate (HMDI), tetramethyl xylene diisocyanate (TMXDI), hexamethylene diisocyanate (HDI), or oligomer materials of these materials such as a trimer of IPDI, HDI or a biuret of HDI, and mixtures thereof. Triisocyanates and high-functional isocyanates can also be used. Aromatic and aliphatic diisocyanates, for example, biuret and isocyanurate derivatives can be used.

Suitable polyols for reacting with the polyisocyanates can include, but are not limited to, polyether polyols (e.g., block polyethylene and polypropylene oxide homopolymers and/or copolymers having a molecular weight of about 300 to about 3,000), alkylated polyols (e.g., polytetramethylene ether glycols), or caprolactone-based polyols. In some examples, the reactants for making the polyurethane prepolymer can be or include mixtures of aliphatic and aromatic polyols, or a multi-functional, active hydrogen-bearing polymer. As such, in addition to or in lieu of polyether polyols, the hydroxyl-functional component can include derivatives of acrylates, esters, vinyls, and castor oils, as well as polymers, or any mixture thereof.

Isocyanate equivalents can predominate over active hydrogen equivalents in the polyisocyanate/polyol reaction mixture to produce a prepolymer that can include residual isocyanate groups. The isocyanate and the polyol can be combined with one another in any predetermined ratio. For example, the isocyanate and the polyol can be combined with one another at a molar ratio of about 1:5, about 1:4, or about 1:2 to about 1:1, about 2:1, about 4:1, or about 5:1. Suitable reaction conditions for producing the unsaturated polyurethane prepolymer can include those discussed and described in Heiss, et al., "Influence of Acids and Bases on Preparation of Urethane Polymers," Industrial and Engineering Chemistry, Vol. 51, No. 8, August 1959, pp. 929-934. Depending upon the reaction conditions used (such as, for example, temperature and the presence of strong acids or bases, and catalysts), the reaction may lead to the formation of ureas, allophanates, biurets, or isocyanates.

Suitable amine group containing compounds that can be reacted with the polyisocyanates can include, but are not limited to, unsaturated polyamines represented by the general Formula XII discussed and described above. Suitable carboxyl group containing compounds that can be reacted with the polyisocyanates can include, but are not limited to, unsaturated aliphatic diacids. Illustrative unsaturated aliphatic diacids can include, but are not limited to, maleic acid, itaconic acid, fumaric acid, glutaconic acid, citraconic acid, traumatic acid, muconic acid, aconitic acid, or any mixture thereof.

Polyamidoamines and unsaturated glycidyl ethers suitable for producing one or more products formed by reacting the polyamidoamine and the unsaturated glycidyl ether can widely vary. The polyamidoamine can be a reaction product of a polyamine and a dicarboxylic acid. In some examples, the polyamine can be dimethylenetriamine, diethylenetriamine, triethylenetetramine, tripropylenetetramine, tetraethylenepentamine, pentaethylenehexamine, or any mixture thereof. The dicarboxylic acid can be glutaric acid, adipic acid, azelaic acid, malonic acid, suberic acid, sebacic acid, succinic acid, oxalic acid, pimelic acid, derivatives thereof, or any mixture thereof. The epihalohydrin can be epichlorohydrin, epibromohydrin, epifluorohydrin, epiiodohydrin, or any mixture thereof.

Illustrative unsaturated glycidyl ethers can be represented by general Formula VII discussed and described above. Suitable reaction products produced by reacting one or more polyamidoamines and one or more unsaturated glycidyl ethers and methods for making the reaction products can be as discussed and described in U.S. Pat. Nos. 2,864,775 and 3,280,054.

The products formed by reacting the polyamidoamines and the unsaturated glycidyl ethers can act or serve as active reducers. As used herein, the term "active reducer" refers to compounds that can participate in a cross-linking reaction, e.g., have double bonds, and also have one or more groups that can be oxidized, e.g., a tertiary amine.

In some examples, the unsaturated prepolymer can be combined with water to produce a water and unsaturated prepolymer mixture. For example, water can be mixed, blended, or otherwise combined with the unsaturated prepolymer to produce the water and unsaturated prepolymer mixture. The unsaturated prepolymer can be soluble in water. The unsaturated prepolymer can be dissolved in water to produce an aqueous unsaturated prepolymer solution. The unsaturated prepolymer can be combined with water to form an aqueous suspension, emulsion, or dispersion. The amount of the water, combined with the unsaturated prepolymer can be about 1 wt %, about 5 wt %, about 10 wt %, about 15 wt %, about 20 wt %, about 25 wt %, about 30 wt %, or about 35 wt % to about 50 wt %, about 55 wt %, about 60 wt %, about 65 wt %, about 70 wt %, or about 75 wt %, based on the combined weight of the water and the unsaturated prepolymer. The unsaturated polyester prepolymer combined with water can have a viscosity of about 20 cP, about 100 cP, about 1,000 cP, about 5,000 cP, or about 10,000 cP to about 50,000 cP, about 100,000 cP, about 200,000 cP, or about 300,000 cP at a temperature of about 25° C.

In some examples, one or more catalysts or unsaturated polyurethane prepolymer catalysts can be used to accelerate the rate of reaction of the polyisocyanate and the polyol to produce the unsaturated polyurethane prepolymer. Suitable catalysts can include, but are not limited to, dibutyl tin dilaurate. In some examples, one or more inhibitors can be used to slow the cross-linking reaction. Suitable inhibitors can include, but are not limited to, benzoyl chloride and monophenyldichlorophosphate.

In some examples, the unsaturated prepolymer, can have a pH of about 0.5, about 2, about 3, or about 4 to about 7, about 7.5, about 8, about 8.5, or about 9. For example, the unsaturated polyester prepolymer can have a pH of about 1.5 to about 9, about 2.5 to about 7, about 1 to about 5, about 5 to about 8, or about 3 to about 6.

In some examples, any one or more of the polyphenolic material, the unsaturated compound, and the free radical precursor can be combined with a liquid medium. The polyphenolic material, the unsaturated compound, and the free radical precursor, when combined with the liquid medium, can have a total concentration of solids of about 1 wt % to about 99 wt %. For example, the polyphenolic material and/or the unsaturated compound combined with a liquid medium can have a concentration of solids of about 5 wt %, about 10 wt %, about 15 wt %, or about 20 wt % to about 40 wt %, about 50 wt %, about 60 wt %, about 70 wt %, or about 80 wt %, based on the combined weight of the polyphenolic material and/or the unsaturated compound and the liquid medium. In another example, the polyphenolic material and/or the unsaturated compound combined with a liquid medium can have a concentration of solids of about 40% to about 60%, about 45% to about 55%, or about 47% to about 50%, based on the combined weight of the polyphenolic material and/or the unsaturated compound and the liquid medium. In another example, the polyphenolic material and/or the unsaturated compound combined with a liquid medium can have a concentration of solids of about 10% to about 30%, about 15% to about 35%, about 20% to about 40%, about 25% to about 45%, about 20% to about 50%, or about 35% to about 55%, based on the combined weight of the polyphenolic material and/or the unsaturated compound and the liquid medium.

As noted above, the binder composition can be mixed, blended, stirred, contacted, or otherwise combined with one or more lignocellulose substrates to produce the lignocellulose binder mixture. Combining the free radical precursor with at least one unsaturated compound and at least one polyphenolic material, a binder composition having predetermined properties can exhibit improved properties attributable to each of the unsaturated compound and the polyphenolic material when each used with the same free radical precursor alone. For example, the unsaturated compound, when combined with the free radical precursor in the absence of the polyphenolic material, can be used to make composite products, e.g., composite lignocellulose products, which have outstanding internal bond strength, but a low resistance to water absorption. Additionally, a binder composition that includes only the unsaturated compound and the free radical precursor exhibits little, if any, tack. In contrast, a binder composition that includes only the polyphenolic material and the free radical precursor can be used to make composite products (e.g., composite lignocellulose products) that have good internal bond strength (not as high as the unsaturated compound and good resistance to water absorption. The binder that includes only the polyphenolic material and the free radical precursor also exhibits good tack as compared to the binder composition that includes only the unsaturated compound and the free radical precursor. Accordingly, combing both the unsaturated compound and the polyphenolic material in the presence of the free radical precursor can provide a predetermined balance of properties of the binder composition, e.g., predetermined tack, and/or predetermined composite product properties, e.g., internal bond strength and/or resistance to water absorption.

In some examples, the components of the binder composition can be combined with the lignocellulose substrates in any order or combination with respect to one another such that the binder composition is formed in the presence of the one or more lignocellulose substrates. For example, the unsaturated compound and the polyphenolic material can be combined with one another to produce a partial or intermediate binder composition, the partial composition can be combined with the lignocellulose substrates to produce a partial mixture, and the free radical precursor can be combined with the partial mixture to produce the lignocellulose binder mixture. In another example, the components of the binder composition can independently be combined with the lignocellulose substrates in any order or sequence to produce the lignocellulose binder mixture.

In some examples, if the free radical precursor includes two or more components, e.g., a catalyst and an oxidant, the components of the free radical precursor can be combined with the lignocellulose substrates and the optional compound having at least two hydrogen atoms that are abstractable in the presence of hydroxyl radicals in any order or sequence. For example, if the free radical precursor includes a catalyst and an oxidant, the catalyst can be combined with the lignocellulose substrates to produce a first partial lignocellulose binder mixture and the oxidant can be combined with the first partial lignocellulose binder mixture to produce the lignocellulose binder mixture or vice versa. In another example, the catalyst and the compound having at least two hydrogen atoms that are abstractable in the presence of hydroxyl radicals can be combined with one another to produce a first partial lignocellulose binder mixture, the first partial lignocellulose binder mixture can be combined with the lignocellulose substrates to produce a second partial lignocellulose binder mixture, and the oxidant can be combined with the second partial lignocellulose binder mixture to produce the lignocellulose binder mixture. In still another example, the oxidant and the compound having at least two hydrogen atoms that are abstractable in the presence of hydroxyl radicals can be combined with one another to produce a first partial lignocellulose binder mixture, the first partial lignocellulose binder mixture can be combined with the lignocellulose substrates to produce a second partial lignocellulose binder mixture, and the catalyst can be combined with the second partial lignocellulose binder mixture to produce the lignocellulose binder mixture. In another example, the oxidant and the catalyst can be combined with one another to produce a first partial lignocellulose binder mixture, the first partial lignocellulose binder mixture can be combined with the lignocellulose substrates to produce a second partial lignocellulose binder mixture, and the compound having at least two hydrogen atoms that are abstractable in the presence of hydroxyl radicals can be combined with the second partial lignocellulose binder mixture to produce the lignocellulose binder mixture.

The components of the lignocellulose binder mixture can be introduced or otherwise contacted with one another via any suitable delivery method. For example, the lignocellulose substrates can be in a vessel or other container and the binder composition or one or more components of the binder composition can be sprayed or otherwise directed onto the lignocellulose substrates to produce the lignocellulose binder mixture. In another example, the binder composition or one or more components of the binder composition can be poured or brushed onto the lignocellulose substrates. In another example, the lignocellulose substrates can be directed, transported, introduced, or otherwise conveyed into a vessel already containing any one or more of the other components of the lignocellulose binder mixture. Therefore, for example, the lignocellulose substrates can be dipped, soaked, or otherwise contacted with the binder composition or one or more components of the binder composition. In another example, the components of the binder composition can be added or combined with the lignocellulose substrates separately or independently from one another in any order or sequence. In another example, two or more components of the binder composition can be combined with one another to form a partial binder composition, e.g., the polyphenolic material, the unsaturated compound, and a catalyst component of the free radical precursor, and the partial binder composition can be combined with the lignocellulose substrates to produce a partial lignocellulose binder mixture. The remaining component, e.g., an oxidant, can be combined with the partial lignocellulose binder mixture to produce the lignocellulose binder mixture.

In some examples, the lignocellulose binder mixture and/or the composite product can include the polyphenolic material or the lignin compound in an amount of about 0.005 wt %, about 0.01 wt %, about 0.05 wt %, about 0.07 wt %, about 0.09 wt %, about 0.1 wt %, about 0.15 wt %, about 0.2 wt %, about 0.3 wt %, about 0.4 wt %, about 0.5 wt %, about 0.6 wt %, about 0.7 wt %, about 0.8 wt %, or about 0.9 wt % to about 1 wt % or greater, about 1.5 wt % or greater, about 2 wt % or greater, about 2.5 wt % or greater, about 3 wt % or greater, about 3.5 wt % or greater, about 4 wt % or greater, about 4.5 wt % or greater, about 5 wt % or greater, about 6 wt % or greater, about 7 wt % or greater, about 8 wt % or greater, about 9 wt % or greater, about 10 wt % or greater, about 15 wt % or greater, or about 20 wt % or greater, based on a dry weight of the lignocellulose substrates. The lignocellulose binder mixture and/or the composite product can include the polyphenolic material or the lignin compound in an amount of about 0.05 wt % to about 10 wt % or greater, such as, for example, about 0.05 wt % to about 5 wt %, about 0.07 wt % to about 4 wt %, about 0.09 wt % to about 3 wt %, about 0.1 wt % to about 1 wt %, about 0.15 wt % to about 1 wt %, or about 0.15 wt % to about 0.5 wt %, based on a dry weight of the lignocellulose substrates. The lignocellulose binder mixture and/or the composite product can include the polyphenolic material or the lignin compound in an amount of about 0.1 wt % to about 20 wt %, about 0.2 wt % to about 15 wt %, about 0.5 wt % to about 10 wt %, about 1 wt % to about 10 wt %, about 2 wt % to about 8 wt %, or about 2 wt % to about 6 wt %, based on a dry weight of the lignocellulose substrates.

In other examples, the lignocellulose binder mixture and/or the composite product can include the polyphenolic material or the lignin compound in an amount of about 0.5 wt %, about 1 wt %, about 3 wt %, about 5 wt %, about 7 wt %, about 10 wt %, about 12 wt %, or about 15 wt % to about 20 wt %, about 23 wt %, about 25 wt %, about 27 wt %, about 30 wt %, about 33 wt %, or about 35 wt %, based on a dry weight of the lignocellulose substrates. For example, the amount of the polyphenolic material in the lignocellulose binder mixture can be about 1 wt % to about 6 wt %, about 2 wt % to about 10 wt %, about 4 wt % to about 8 wt %, about 6 wt % to about 12 wt %, about 8 wt % to about 18 wt %, about 10 wt % to about 25 wt %, about 15 wt % to about 30 wt %, or about 3 wt % to about 9 wt %, based on a dry weight of the lignocellulose substrates.

The lignocellulose binder mixture and/or the composite product can include the unsaturated compound in an amount of about 0.5 wt %, about 1 wt %, about 3 wt %, about 5 wt %, about 7 wt %, about 10 wt %, about 12 wt % to about 14 wt %, about 16 wt %, about 18 wt %, about 20 wt % about 22 wt %, or about 24 wt %, based on a dry weight of the lignocellulose substrates. For example, the lignocellulose binder mixture and/or the composite product can include the unsaturated compound in an amount of about 0.5 wt % to about 3 wt %, about 1.5 wt % to about 4 wt %, about 2 wt % to about 6 wt %, about 3 wt % to about 5 wt %, about 6 wt % to about 10 wt %, about 3 wt % to about 15 wt %, or about 7 wt % to about 19 wt %, based on a dry weight of the lignocellulose substrates.

The lignocellulose binder mixture and/or the composite product can include the free radical precursor in an amount of about 0.1 wt %, about 0.5 wt %, about 1 wt %, about 2 wt %, about 3 wt %, about 4 wt %, about 5 wt %, about 7 wt %, or about 10 wt % to about 15 wt %, about 17 wt %, about 19 wt %, about 21 wt %, about 23 wt %, about 25 wt %, about 27 wt %, or about 29 wt %, based on a dry weight of the lignocellulose substrates. For example, the lignocellulose binder mixture and/or the composite product can include the free radical precursor in an amount of about 0.1 wt % to about 8 wt %, about 0.5 wt % to about 6 wt %, about 1 wt % to about 5 wt %, about 2 wt % to about 4 wt %, about 4 wt % to about 12 wt %, about 6 wt % to about 16 wt %, about 10 wt % to about 22 wt %, or about 3 wt % to about 21 wt %, based on a dry weight of the lignocellulose substrates.

The lignocellulose binder mixture can include the oxidant in an amount of about 0.1 wt %, about 0.5 wt %, about 1 wt %, about 2 wt %, about 3 wt %, about 4 wt %, about 5 wt %, or about 7 wt % to about 9 wt %, about 11 wt %, about 13 wt %, about 15 wt %, about 17 wt %, or about 19 wt %, based on a dry weight of the lignocellulose substrates. For example, the lignocellulose binder mixture can include the oxidant in an amount of about 0.1 wt % to about 3 wt %, about 1 wt % to about 5 wt %, about 2 wt % to about 6 wt %, about 2.5 wt % to about 10 wt %, about 3 wt % to about 6 wt %, about 4 wt % to about 14 wt %, about 6 wt % to about 18 wt %, about 1 wt % to about 11 wt %, or about 2.5 wt % to about 5.5 wt %, based on a dry weight of the lignocellulose substrates.

The lignocellulose binder mixture and/or the composite product can include the complexed metal catalyst in an amount of about 0.001 wt %, about 0.005 wt %, about 0.01 wt %, about 0.03 wt %, about 0.05 wt %, about 0.07 wt %, about 0.1 wt %, about 0.12 wt %, about 0.14 wt %, about 0.16 wt %, or about 0.18 wt % to about 0.4 wt %, about 0.8 wt %, about 1 wt %, about 1.5 wt %, about 2 wt %, about 2.5 wt %, about 3 wt %, about 3.5 wt %, about 4 wt %, about 4.5 wt %, or about 5 wt %, based on a dry weight of the lignocellulose substrates. For example, the lignocellulose binder mixture and/or the composite product can include the complexed metal catalyst in an amount of about 0.05 wt % to about 0.5 wt %, about 0.1 wt % to about 0.4 wt %, about 0.15 wt % to about 0.35 wt %, about 0.2 wt % to about 0.45 wt %, about 0.3 wt % to about 2 wt %, about 0.15 wt % to about 4 wt %, about 1 wt % to about 3 wt %, about 0.2 wt % to about 4.5 wt %, or about 0.1 wt % or about 0.25 wt %, based on a dry weight of the lignocellulose substrates.

The lignocellulose binder mixture can be heated to produce a lignocellulose containing composite product or "composite product". For example, the lignocellulose binder mixture can be heated to a temperature of about 60° C., about 90° C., about 120° C., about 150° C., or about 160° C. to about 170° C., about 200° C., about 230° C., about 260° C., or about 300° C. to produce the composite product. In another example, the lignocellulose binder mixture can be heated to a temperature of at least 60° C., at least 70° C., at least 80° C., at least 90° C., at least 100° C., at least 110° C., at least 120° C., at least 130° C., or at least 140° C. to about 150° C., about 155° C., about 160° C., about 165° C., about 170° C., about 180° C., about 200° C., about 225° C., about 250° C., about 275° C., or about 300° C. In another example, the lignocellulose binder mixture can be heated to a temperature of about 140° C. to about 200° C., about 155° C. to about 175° C., about 160° C. to about 210° C., about 160° C. to about 175° C., or about 145° C. to about 225° C.

In some examples, the lignocellulose binder mixture can be heated in air. In some examples, the lignocellulose binder mixture can be heated in an inert atmosphere or substantially an inert atmosphere such as nitrogen. If the lignocellulose binder mixture is heated in a substantially inert atmosphere, the amount of oxygen can be less than 5 mol %, less than 3 mol %, less than 1 mol %, less than 0.5 mol %, or less than 0.1 mol % oxygen relative to the balance of gases in the inert atmosphere. Suitable inert gases can be or include, but are not limited to, nitrogen, argon, helium, or any mixture thereof.

Heating the binder composition and/or the lignocellulose binder mixture can cause or promote the at least partial curing of the binder composition to produce the composite product. As used herein, the terms "curing", "cured", "at least partially curing", "at least partially cured", and similar terms are intended to refer to the structural and/or morphological change that occurs in the lignocellulose binder mixture, such as by covalent chemical reaction (crosslinking), ionic interaction or clustering, phase transformation or inversion, and/or hydrogen bonding when the is subjected to conditions sufficient, e.g., sufficiently heated, to cause the properties of a flexible, porous substrate, such as a nonwoven mat or blanket of lignocellulose substrates and/or a rigid or semi-rigid substrate, such as a wood or other lignocellulose containing board or sheet, to which an effective amount of the binder composition has been applied, to be altered.

When the binder composition is heated, the lignocellulose binder mixture can contain at least a portion of the free radical precursor initially added to and present in the binder composition. Therefore, for example, at least a portion of the free radical precursor can remain unreacted or otherwise in the same form as when combined with the additional components of the binder composition, at least until the lignocellulose binder mixture is heated. For example, if the free radical precursor includes one or more oxidants, e.g., hydrogen peroxide ($H_2O_2$), at least a portion of the oxidant in the form of hydrogen peroxide can be present when heating of the lignocellulose binder mixture is initiated or started. In some examples, the lignocellulose binder mixture can contain at least 1 wt %, at least 3 wt %, at least 5 wt %, at least 7 wt %, at least 9 wt %, 11%, at least 13%, at least 15%, at least 20%, at least 25%, at least 30%, at least 35%, at least 40%, at least 45%, at least 50%, at least 55%, at least 60%, at least 65%, or at least 70% of the total amount of free radical precursor initially present in the lignocellulose binder mixture, e.g., the total amount of the free radical precursor combined with the plurality of lignocellulose substrates, the polyphenolic material, and the unsaturated compound, when the lignocellulose binder mixture is heated. In another example, the lignocellulose binder mixture can contain about 11% to about 95%, about 15% to about 85%, about 20% to about 90%, about 30% to about 80%, about 11% to about 100%, about 35% to about 75%, about 40% to about 70%, about 50% to about 70%, about 60% to about 80%, about 65% to about 85%, or about 30% to about 95% of the total amount of free radical precursor initially present in the lignocellulose binder mixture when the lignocellulose binder mixture is heated. In at least one specific example, if the lignocellulose binder mixture includes about 5 wt % free radical precursor, based on a dry weight of the lignocellulose substrates when the lignocellulose binder mixture is initially formed, when the lignocellulose binder mixture is heated to a temperature of about 60° C. or more at least 11% of the free radical precursor can be present in the lignocellulose binder mixture. Therefore, for example, if the lignocellulose binder mixture contains about 5 wt % of the one or more free radical precursors, based on a dry weight of the lignocellulose substrates, upon preparation or formation of the lignocellulose binder mixture, when heating the lignocellulose binder mixture is initiated or started, the lignocellulose binder mixture can have a free radical precursor concentration of at least 11% of the initial 5 wt % or 0.55 wt %, based on a dry weight of the lignocellulose substrates.

In some examples, the amount of the complexed metal catalyst or the amount of the metal, if present in a catalyst that includes the metal bound to the complexing agent, that can remain bound to the complexing agent until the lignocellulose binder mixture is heated, e.g., to a temperature of about 60° C. to about 300° C., can be at least 1 wt %, at least 3 wt %, at least 5 wt %, at least 7 wt %, at least 9 wt %, at least 11%, at least 13%, at least 15%, at least 20%, at least 25%, at least 30%, at least 35%, at least 40%, at least 45%, at least 50%, at least 55%, at least 60%, at least 65%, or at least 70% of the amount of metal that was initially present in the lignocellulose binder mixture and bound to the complexing agent. In another example, the amount of the complexed metal catalyst or the amount of the metal, if present in the catalyst, that can remain bound to the complexing agent until the lignocellulose binder mixture is heated, e.g., to a temperature of about 60° C. to about 300° C., can be about 11% to about 95%, about 15% to about 85%, about 20% to about 90%, about 30% to about 80%, about 11% to about 100%, about 35% to about 75%, about 40% to about 70%, or about 30% to about 95% of the amount of the metal initially present in the lignocellulose binder mixture and bound to the complexing agent.

In some examples, the amount of the one or more free radical precursors present when the lignocellulose binder mixture is heated, e.g., to a temperature of about 60° C. to about 300° C., can be at least 0.5 wt %, at least 0.7 wt %, at least 1 wt %, at least 1.2 wt %, at least 1.5 wt %, at least 1.7 wt %, at least 2 wt %, at least 2.2 wt %, at least 2.5 wt %, at least 2.7 wt %, at least 3 wt %, at least 3.2 wt %, at least 3.5 wt %, at least 3.7 wt %, at least 4 wt %, at least 4.2 wt %, at least 4.5 wt %, at least 4.7 wt %, or at least 5 wt %, based on the dry weight of the plurality of lignocellulose substrates. For example, the amount of the one or more free radical precursors present when the lignocellulose binder mixture is heated can be about 1 wt %, about 1.5 wt %, about 1.6 wt %, about 1.8 wt %, or about 2.1 wt % to high of about 5 wt %, about 7 wt %, about 10 wt %, about 15 wt %, about 20 wt % or greater, based on the dry weight of the plurality of lignocellulose substrates. In another example, the amount of the one or more free radical precursors present when the lignocellulose binder mixture is heated can be about 1 wt % to about 10 wt %, about 1.5 wt % to about 7 wt %, about 2 wt % to about 6 wt %, about 2.5 wt % to about 8 wt %, about 3 wt % to about 5.5 wt %, about 4 wt % to about 6.5 wt %, about 2.2 wt % to about 11 wt %, or about 2.3 wt % to about 6.3 wt %, based on the dry weight of the plurality of lignocellulose substrates.

The lignocellulose binder mixture can be heated as soon as the lignocellulose binder mixture is formed. The lignocellulose binder mixture can be kept, held, or otherwise maintained at a temperature less than about 60° C. for a period of time prior to heating the lignocellulose binder mixture to a temperature of at least 60° C. An exothermic reaction between the components of the lignocellulose binder mixture can be substantially and significantly slowed and/or prevented such that the lignocellulose binder mixture does not significantly increase in temperature until the lignocellulose binder mixture is intentionally heated can be to select an appropriate free radial precursor or mixture of free radical precursors. The temperature of the lignocellulose binder mixture, therefore, without external heat directed to the lignocellulose binder mixture, can remain free from or substantially free from the development of an exotherm by selecting an appropriate free radical precursor. The particular temperature of the lignocellulose binder mixture during the time period before heating can depend, at least in part, on the ambient or environmental temperature where the lignocellulose binder mixture is located. In some examples, the lignocellulose binder mixture can be maintained at a temperature of less than 60° C. without any intentional removal of heat therefrom. In some examples, the lignocellulose binder mixture can be maintained at a temperature of less than 60° C. with removal of heat therefrom, e.g., the lignocellulose binder mixture can be located within a refrigeration device and/or a cooled fluid such as chilled air can be directed toward and/or passed through the lignocellulose binder mixture. In some examples, the lignocellulose binder mixture can be maintained at a temperature of less than 60° C. by controlling or adjusting a water concentration of the lignocellulose binder mixture. For example, increasing the water concentration of the lignocellulose binder mixture can reduce, inhibit, or prevent the lignocellulose binder mixture from undergoing an exothermic reaction.

Prior to heating the lignocellulose binder mixture to a temperature of at least 60° C., the lignocellulose binder mixture can be maintained at a temperature less than 60° C., less than 55° C., less than 50° C., less than 45° C., less than 40° C., less than 35° C., or less than 30° C. for at least 10 min, at least 13 min, at least 15 min, at least 17 min, at least 20 min, at least 23 min, at least 25 min, at least 27 min, at least 30 min, at least 33 min, at least 35 min, at least 37 min, at least 40 min, at least 43 min, at least 45 min, at least 47 min, at least 50 min, at least 53 min, at least 55 min, at least 57 min, or at least 60 min. For example, the lignocellulose binder mixture can be maintained at a temperature less than 60° C. for at least 10 min to about 30 min, at least about 15 min to about 35 min, at least about 20 min to about 40 min, at least about 18 min to about 45 min, or at least about 15 min to about 40 min prior to heating the lignocellulose binder mixture to a temperature of at least 60° C. In another example, the lignocellulose binder mixture can be maintained at a temperature less than 60° C. for at least 10 min, about 30 min, about 45 min, about 1 hr, about 2 hr, about 3 hr, about 5 hr, about 12 hr, about 18 hr, about 24 hr, or about 30 hr prior to heating the lignocellulose binder mixture to a temperature of at least 60° C.

Prior to heating the lignocellulose binder mixture to a temperature of at least 60° C., the amount of energy generated from the lignocellulose binder mixture due to exothermic reactions between the components of the lignocellulose binder mixture can be less than about 20 cal/g of the lignocellulose binder mixture, less than about 18 cal/g of the lignocellulose binder mixture, less than about 16 cal/g of the lignocellulose binder mixture, less than about 15 cal/g of the lignocellulose binder mixture, less than about 14 cal/g of the lignocellulose binder mixture, or less than about 13.8 cal/g of the lignocellulose binder mixture. For example, prior to heating the lignocellulose binder mixture to a temperature of at least 60° C., the amount of energy generated from the lignocellulose binder mixture due to exothermic reactions between the components of the lignocellulose binder mixture can be less than 14 cal/g, less than 13.5 cal/g, less than 13 cal/g, less than 12.5 cal/g, less than 12 cal/g, less than 11.5 cal/g, less than 11 cal/g, less than 10.5 cal/g, less than 10 cal/g, less than 9.5 cal/g, less than 9 cal/g, less than 8.5 cal/g, less than 8 cal/g, less than 7.5 cal/g, less than 7 cal/g, less than 6.5 cal/g, less than 6 cal/g, less than 5.5 cal/g, less than 5 cal/g, less than 4.5 cal/g, less than 4 cal/g, less than 3.5 cal/g, less than 3 cal/g, less than 2.5 cal/g. less than 2 cal/g, less than 1.5 cal/g, less than 1 cal/g, or less than 0.5 cal/g of the lignocellulose binder mixture.

Composite products in the shape or form of a panel, sheet, board, or the like can be in the form of a rectangular prism that includes six outer surfaces, e.g., three pairs of oppositely facing surfaces. The first pair of oppositely facing surfaces of the composite product can include a first or "top" surface and an opposing second or "bottom" surface. The second and third pairs of oppositely facing surfaces of the composite product can be referred to as the "side surfaces" that have a surface area less than the surface area of the first and second surfaces. As such, composite products in the shape or form of a panel, sheet, board, or the like can have an average thickness, where the average thickness is the length or distance between the first and second surfaces.

If the composite product is in the form of a panel, sheet, board, or the like, the amount or length of time the lignocellulose binder mixture can be heated can be about 5 sec per millimeter of the average thickness of the composite product (s/mm), about 10 s/mm, about 12 s/mm, or about 15 s/mm to about 17 s/mm, about 19 s/mm, about 21 s/mm, about 23 s/mm, about 25 s/mm, about 27 s/mm, about 30 s/mm, about 35 s/mm, about 40 s/mm, about 50 s/mm, or about 60 s/mm. For example, the lignocellulose binder mixture can be heated for a time of about 5 s/mm to about 55 s/mm, about 10 s/mm to about 45 s/mm, about 15 s/mm to about 40 s/mm, about 5 s/mm to about 25 s/mm, about 7 s/mm to about 27 s/mm, about 9 s/mm to about 24 s/mm, about 11 s/mm to about 22 s/mm, about 8 s/mm to about 20 s/mm, about 14 s/mm to about 18 s/mm, about 6 s/mm to about 14 s/mm, about 10 s/mm to about 18 s/mm, or about 10 s/mm to about 16 s/mm. In another example, the lignocellulose binder mixture can be heated for a time less than 120 s/mm, less than 110 s/mm, less than 100 s/mm, less than 90 s/mm, less than 80 s/mm, less than 70 s/mm, less than 60 s/mm, less than 50 s/mm, less than 40 s/mm, less than 30 s/mm, less than 25 s/mm, less than 22 s/mm, less than 20 s/mm, less than 18 s/mm, less than 17 s/mm, less than 16 s/mm, less than 15 s/mm, less than 14 s/mm, less than 13 s/mm, or less than 12 s/mm. In one specific example, a composite product in the form of a panel, sheet, board, or the like and having an average thickness of about 15 mm and subjected to a total heating time of about 4 min would correspond to heating the lignocellulose binder mixture for about 16 s/mm. In at least one specific example, the lignocellulose binder mixture can be heated to a temperature of about 160° C. to about 170° C. for a time of about 10 s/mm to about 30 s/mm, about 13 s/mm to about 19 s/mm, about 15 s/mm to about 40 s/mm, or about 8 s/mm to about 50 s/mm.

Pressure can optionally be applied to the lignocellulose binder mixture before, during, and/or after the lignocellulose binder mixture is heated to produce the composite product. For example, if the predetermined composite product shape or structure is a panel, sheet, board, or the like, an amount of the lignocellulose binder mixture sufficient to produce a composite product of the predetermined size, can be transported, directed, placed, introduced, disposed, or otherwise located within a press before the lignocellulose binder mixture is heated and/or when the lignocellulose binder mixture is heated. The press can be an open press or a closed press. In some specific examples, an open press can be used to press the lignocellulose binder mixture when the lignocellulose binder mixture is heated, e.g., to a temperature of about 100° C. to about 250° C. In another example, the lignocellulose binder mixture can be extruded through a die (extrusion process) and heated to produce the composite product. The lignocellulose binder mixture can be pressed under a pressure of about 0.5 MPa, about 1 MPa, about 3 MPa, or about 5 MPa to about 7 MPa, about 9 MPa, about 11 MPa, about 13 MPa, or about 15 MPa. In some examples, the lignocellulose binder mixture can be pressed at a pressure of about 0.5 MPa to about 15 MPa.

Illustrative open presses can be as discussed and described in U.S. Pat. Nos. 4,017,248; 5,337,655; 5,611,269; 5,950,532; 6,098,532; and 6,782,810. Suitable, commercially available, open presses can include, but are not limited to, the CONTIROLL® press available from Siempelkamp and the CPS press available from Dieffenbacher.

The pH of the lignocellulose binder mixture can be acidic, neutral, or basic. For example, the pH of the lignocellulose binder mixture can be about 1, about 2, or about 3 to about 4, about 5, about 6, about 7, or about 8. In another example, the pH of the lignocellulose binder mixture can be about 1 to about 6, about 1.5 to about 5.5, about 2.5 to about 4.5, about 2 to about 3.5, or about 2.5 to about 3.5. The pH of the lignocellulose binder mixture can be adjusted to any predetermined pH by combining one or more base compounds, one or more acid compounds, or a combination of one or more base compounds and one or more acid compounds therewith.

Illustrative base compounds that can be used to adjust the pH of the lignocellulose binder mixture can include, but are not limited to, hydroxides, carbonates, ammonia, amines, or any mixture thereof. Illustrative hydroxides can include, but are not limited to, sodium hydroxide, potassium hydroxide, ammonium hydroxide (e.g., aqueous ammonia), lithium hydroxide, and cesium hydroxide. Illustrative carbonates can include, but are not limited to, sodium carbonate, sodium bicarbonate, potassium carbonate, and ammonium carbonate. Illustrative amines can include, but are not limited to, trimethylamine, triethylamine, triethanolamine, diisopropylethylamine (Hunig's base), pyridine, 4-dimethylaminopyridine (DMAP), and 1,4-diazabicyclo[2.2.2]octane (DABCO).

Illustrative acid compounds that can be used to adjust the pH of the lignocellulose binder mixture can include, but are not limited to, one or more mineral acids, one or more organic acids, one or more acid salts, or any mixture thereof. Illustrative mineral acids can include, but are not limited to, hydrochloric acid, nitric acid, phosphoric acid, sulfuric acid, or any mixture thereof. Illustrative organic acids can include, but are not limited to, acetic acid, formic acid, citric acid, oxalic acid, uric acid, lactic acid, or any mixture thereof. Illustrative acid salts can include, but are not limited to, ammonium sulfate, sodium bisulfate, sodium metabisulfite, or any mixture thereof.

The lignocellulose binder mixture can include one or more liquid mediums. The one or more liquid mediums can be present in any one or more of the lignocellulose substrates, the free radical precursor, the polyphenolic material, and/or the unsaturated compound. The liquid medium can be or include, but is not limited to, water, alcohols, glycols, acetonitrile, dimethyl sulfoxide, N,N-dimethylformamide, N-methylpyrrolidone, or any mixture thereof. Suitable alcohols can include, but are not limited to, methanol, ethanol, propanol, isopropanol, butanol, or any mixture thereof. Suitable glycols can include, but are not limited to, ethylene glycol, propylene glycol, or a combination thereof. As used herein, the terms "aqueous medium" and "aqueous liquid" can be or include water and/or mixtures composed of water and/or other water-miscible solvents. Illustrative water-miscible solvents can include, but are not limited to, alcohols, ethers, amines, and other polar aprotic solvents. In at least one example, the liquid medium can be water and the catalyst, the oxidant, the polyphenolic material, and/or the unsaturated compound can be combined with water.

The lignocellulose binder mixture can have a liquid, e.g., water, content of about 1 wt %, about 3 wt %, about 5 wt %, or about 10 wt % to high of about 12 wt %, about 14 wt %, about 16 wt %, about 18 wt %, about 20 wt %, about 22 wt %, or about 24 wt %. For example, when the lignocellulose binder mixture contains water as the liquid, the lignocellulose binder mixture can have a moisture content of about 10 wt % to about 25 wt %, about 12 wt % to about 20 wt %, about 11 wt % to about 19 wt %, about 13 wt % to about 18 wt %, about 15 wt % to about 18 wt %, about 12 wt % to about 17 wt %, or about 14 wt % to about 17 wt %, based on the total weight of the lignocellulose binder mixture.

The lignocellulose substrates can include any one or more of the plant and vegetable materials discussed and described above with reference to the source for the lignins and tannins. As used herein, the term "lignocellulose" refers to a material that includes lignin and cellulose, hemicelluose, or a combination of cellulose and hemicelluloses. The starting material, from which the lignocellulose substrates can be or can be derived from, can be shaped, reduced, or otherwise formed to the appropriate dimensions by various processes such as hogging, grinding, hammer milling, tearing, shredding, and/or flaking. Other processes for producing the substrates can include skiving, cutting, slicing, and/or sawing. Suitable forms of the lignocellulose substrates can include, but are not limited to, chips, flakes, wafers, fibers, powder, shavings, sawdust or dust, veneer, strands, and/or the like. Accordingly, the term "substrate" when used in conjunction with "lignocellulose" refers to lignocellulose material or lignocellulose containing material having any predetermined shape such as chips, flakes, fibers, powder, shavings, sawdust or dust, veneer, strands, and/or the like. Other suitable lignocellulose substrates can include, but are not limited to, wood chips, wood fibers, wood flakes, wood strands, wood wafers, wood shavings, wood particles, wood veneer, or any combination thereof.

The particular configuration of the substrates can be based, at least in part, on the predetermined product. For example, particulates such as chips, fibers, shavings, sawdust or dust, or the like can be used for producing particleboards, fiberboards, or other boards. The substrates can have a length of about 0.05 mm, about 0.1 mm, about 0.2 mm to about 1 mm, about 5 mm, about 10 mm, about 20 mm, about 30 mm, about 40 mm, about 50 mm, or about 100 mm. In another example, veneers, e.g., layers or sheets of wood, can be used for producing plywood, or laminated veneer lumber. The veneers can have a thickness of about 0.8 mm, about 0.9 mm, about 1 mm, about 1.1 mm or about 1.2 mm to about 3 mm, about 4 mm, about 5 mm, about 6 mm, about 7 mm, about 8 mm, about 9 mm, or about 10 mm.

The lignocellulose substrates can include liquid on, about, and/or within the substrates. For example, the lignocellulose substrates can have a liquid, e.g., moisture, content of about 1 wt %, about 2 wt %, about 3 wt %, about 4 wt %, or about 5 wt % to about 7 wt %, about 9 wt %, about 11 wt %, about 13 wt %, about 15 wt %, about 17 wt %, about 19 wt %, about 21 wt %, about 23 wt %, about 25 wt %, about 27 wt %, about 29 wt %, about 31 wt %, about 33 wt %, about 35 wt %, or about 37 wt % based on a dry weight of the lignocellulose substrate. In another example, the lignocellulose substrates can have a liquid, e.g., moisture, content of about 1 wt % to about 10 wt %, about 2 wt % to about 4 wt %, about 2 wt % to about 3 wt %, about 3 wt % to about 6 wt %, about 5 wt % to about 10 wt %, about 6 wt % to about 8 wt %, or about 4 wt % to about 9 wt %. The lignocellulose substrates can be fresh, e.g., not treated or dried, or dried and/or treated. For example, the lignocellulose substrates and/or the starting material from which the lignocellulose substrates were derived can be at least partially dried. In another example, the lignocellulose substrates can be washed and/or leached with an aqueous medium such as water.

If any one or more of the components discussed and described herein include two or more different compounds, those two or more different compounds can be present in any ratio with respect to one another. Therefore, for example, if the lignocellulose binder mixture includes a first type and a second type of lignocellulose substrate, the free radical precursor, the polyphenolic material, and/or the unsaturated compound, the amount of the first and second components can be present in any predetermined ratio. For example, if the oxidant is present in the free radical precursor and includes a first oxidant and a second oxidant, the lignocellulose binder mixture can have an oxidant composition that includes the first oxidant in an amount of about 1 wt % to about 99 wt % and conversely about 99 wt % to about 1 wt % of the second oxidant, based on the total weight of the oxidant composition, e.g., the total weight of the first and second oxidants. In another example, the amount of the first oxidant can be about 5 wt %, about 10 wt %, about 15 wt %, about 20 wt %, about 25 wt % about 30 wt %, about 35 wt %, about 40 wt %, or about 45 wt % to about 60 wt %, about 65 wt %, about 70 wt %, about 75 wt %, about 80 wt %, about 85 wt %, about 90 wt %, or about 95 wt %, based on the total weight of the first and second oxidants.

One or more salts can optionally be combined with the lignocellulose substrates, the binder composition, and/or any component of the binder composition. The amount of salt present in the lignocellulose binder mixture, if present, can be about 0.1 wt %, about 1 wt %, about 2 wt %, or about 3 wt % to about 10 wt %, about 20 wt %, or about 30 wt %, based on a dry weight of the lignocellulose substrates. The one or more salts can be combined with the lignocellulose substrates, the binder composition, and/or any component of the binder composition in any order or sequence. Illustrative salts can include, but are not limited to, aluminum, calcium, potassium, sodium, copper, cobalt, zinc, magnesium, manganese, barium, and/or lithium cations. Suitable anions can include, but are not limited to, carbonates, chlorides, nitrates, silicates, acetates, formates, sulfates, phosphates, and/or other forms.

Illustrative composite products discussed and described herein can include, but are not limited to, particleboard, fiberboard such as medium density fiberboard ("MDF")

and/or high density fiberboard ("HDF"), plywood such as hardwood plywood and/or softwood plywood, oriented strand board ("OSB"), laminated veneer lumber ("LVL"), laminated veneer boards ("LVB"), or engineered wood flooring.

The method of making one or more composite products can include a continuous, semi-continuous, or non-continuous mixing process in which the lignocellulose substrates and the other components of the lignocellulose binder mixture, e.g., the polyphenolic material, the unsaturated compound, and the free radical precursor, can be introduced to a mixer at a first or introduction region, end, area, or other locations configured to receive the components and the lignocellulose binder mixture can be withdrawn from the mixer via one or more mixture recovery outlets. The mixer can be configured to contain a few hundred kilograms to several thousand kilograms. For example, in a single mixer about 500 kg/hr, about 5,000 kg/hr, about 10,000 kg/hr, or about 13,000 kg/hr to about 16,000 kg/hr, about 20,000 kg/hr, about 25,000 kg/hr, or about 30,000 kg/hr of the lignocellulose binder mixture can be recovered from the mixer. As the lignocellulose binder mixture exits the mixer, the lignocellulose binder mixture can be deposited onto a conveyor belt and can be transported to one or more dryers, moistening systems, presses, and/or other processing equipment. For example, in some specific examples, a particleboard product can be made mixing a first or "face" mixture and a second or "core" mixture in a first and second blend, respectively. The first mixer can produce about 13,600 kg/hr to about 15,900 kg/hr of a "face" mixture and the second mixer can produce about 18,100 kg/hr to about 20,400 kg/hr of a "core" mixture. The "face" and "core" mixtures can be used to produce a particleboard panel or sheet, where the "face" mixture makes up the outer layers of the particleboard and the "core" mixture makes up the inner or core layer of the particleboard.

Referring to particleboard in particular, particleboard made according to methods discussed and described herein can meet or exceed the requirements for H-1, H-2, H-3, M-0, M-1, M-S, M-2, M-3i, LD-1, and/or LD-2 grade particleboard as described in the American National Standards Institute (ANSI) for particleboard, i.e., ANSI A208.1-2009 Particleboard, approved Feb. 2, 2009. Particleboard made according to methods discussed and described herein can meet or exceed the requirements for PBU, D-2, D-3, and/or M-3 as defined by the ANSI for particleboard, i.e., ANSI A208.1-2009 Particleboard, approved Feb. 2, 2009. For example, Tables A and B set out certain requirements for the different grades of particleboard. Referring to oriented strand board (OSB) in particular, OSB made according to methods discussed and described herein can meet or exceed the U.S. Department of Commerce Voluntary Performance Standard PS 2. Referring to plywood in particular, plywood made according to methods discussed and described herein can meet or exceed the U.S. Department of Commerce Voluntary Performance Standard PS 1 and/or PS-2.

In some examples, one or more additives can be combined with the lignocellulose substrates, binder composition, and/or any one or more components of the binder composition, to produce the lignocellulose binder mixture. Illustrative additives can include, but are not limited to, waxes and/or other hydrophobic additives, water, filler materials, extenders, surfactants, release agents, dyes, fire retardants, formaldehyde scavengers, biocides, or any mixture thereof. For composite wood products, such as plywood, typical filler materials can include, but are not limited to, ground pecan and/or walnut shells, and typical extenders can include, for example, wheat flour. Other suitable extenders can include, but are not limited to, polysaccharides. Illustrative polysaccharides can include, but are not limited to, starch, cellulose, gums, such as guar and xanthan, alginates, pectin, gellan, or any mixture thereof. Suitable polysaccharide starches can include, for example maize or corn, waxy maize, high amylose maize, potato, tapioca, and wheat starch. Other starches such as genetically engineered starches can include high amylose potato and potato amylopectin starches.

If one or more additives can be present in the lignocellulose binder mixture and/or the composite product. The amount of each additive can be about 0.01 wt % to about 50 wt %, based on the total weight of the lignocellulose binder mixture or the composite product. For example, the amount of any given component or additive can be about 0.01 wt %, about 0.05 wt %, about 0.1 wt %, about 0.5 wt %, or about 1 wt % to about 3 wt %, about 5 wt %, about 7 wt %, or about 9 wt %, based on the total weight of the lignocellulose binder mixture or the composite product. In another example, the amount of any given additive or component can be about 1 wt %, about 5 wt %, about 10 wt %, about 15 wt %, or about 20 wt % to about 25 wt %, about 30 wt %, about 35 wt %, about 40 wt %, or about 45 wt %, based on the total weight of the lignocellulose binder mixture or the composite product.

In some examples, the method can also include combining one or more waxes, such as an emulsion wax or a slack wax, to produce the lignocellulose binder mixture. Therefore, in some examples, the lignocellulose binder mixture can include the plurality of lignocellulose substrates, one or more complexed metal catalysts, one or more complexing agents, one or more oxidants, one or more polyphenolic materials, and one or more waxes. The composite product, for example, can include the plurality of lignocellulose substrates, one or more complexed metal catalysts, one or more complexing agents, one or more polyphenolic materials, and one or more waxes.

In some examples, the concentration or amount of wax in the lignocellulose binder mixture and/or the composite product can be about 0.01 wt %, about 0.05 wt %, about 0.1 wt %, about 0.5 wt %, about 0.7 wt %, or about 0.9 wt % to about 1 wt %, about 1.1 wt %, about 1.3 wt %, about 1.5 wt %, about 1.7 wt %, about 1.9 wt %, about 2 wt %, about 3 wt %, about 4 wt %, about 5 wt %, about 10 wt %, or greater, based on a dry weight of the lignocellulose substrates. In other examples, the concentration or amount of wax in the lignocellulose binder mixture and/or the composite product can be about 0.01 wt % to about 10 wt %, about 0.1 wt % to about 5 wt %, about 0.3 wt % to about 3 wt %, about 0.5 wt % to about 2 wt %, about 0.7 wt % to about 1.5 wt %, or about 0.9 wt % to about 1.3 wt %, based on a dry weight of the lignocellulose substrates. An exemplary wax can be an emulsion wax, such as CHEMBEAD®30 wax emulsion (30% solid), commercially available from Altana (formerly ChemCor).

The composite product can have a density of about 0.5 g/cm$^3$, about 0.55 g/cm$^3$, about 0.6 g/cm$^3$, about 0.63 g/cm$^3$, about 0.65 g/cm$^3$, about 0.67 g/cm$^3$, or about 0.7 g/cm$^3$ to about 0.75 g/cm$^3$, about 0.77 g/cm$^3$, about 0.8 g/cm$^3$, about 0.83 g/cm$^3$, about 0.85 g/cm$^3$, about 0.88 g/cm$^3$, about 0.93 g/cm$^3$, about 0.97 g/cm$^3$, about 1 g/cm$^3$, about 1.05 g/cm$^3$, about 1.1 g/cm$^3$, about 1.15 g/cm$^3$, about 1.2 g/cm$^3$, about 1.25 g/cm$^3$, about 1.3 g/cm$^3$, about 1.35 g/cm$^3$, about 1.4 g/cm$^3$, about 1.45 g/cm$^3$, about 1.47 g/cm$^3$, about 1.49 g/cm$^3$, about 1.5 g/cm$^3$, about 1.55 g/cm$^3$, about 1.6 g/cm$^3$, about 1.65 g/cm$^3$, about 1.7 g/cm$^3$, about 1.75 g/cm$^3$, about 1.8 g/cm$^3$, about 1.85 g/cm$^3$, about 1.9 g/cm$^3$, about 1.95 g/cm³, about 2 g/cm³, or greater. For example, the composite product can have a density of about 0.7 g/cm³ to about 0.75 g/cm³, about 0.65 g/cm³ to about 0.85 g/cm³, about 0.65 g/cm³ to about 0.8 g/cm³, about 0.67 g/cm³ to about 0.77 g/cm³, about 0.5 g/cm³ to about 1 g/cm³, about 0.5 g/cm³ to about 0.8 g/cm³, about 0.5 g/cm³ to about 0.75 g/cm³, or about 0.64 g/cm³ to about 0.8 g/cm³. In some examples, the composite product can have density of less than 2 g/cm³, less than 1.9 g/cm³, less than 1.8 g/cm³, less than 1.7 g/cm³, less than 1.6 g/cm³, less than 1.5 g/cm³, less than 1.45 g/cm³, less than 1.4 g/cm³, less than 1.35 g/cm³, less than 1.3 g/cm³, less than 1.25 g/cm³, less than 1.2 g/cm³, less than 1.15 g/cm³, less than 1.1 g/cm³, less than 1.05 g/cm³, less than 1 g/cm³, less than 0.95 g/cm³, less than 0.88 g/cm³, less than 0.85 g/cm³, less than 0.83 g/cm³, less than 0.8 g/cm³, less than 0.79 g/cm³, less than 0.78 g/cm³, less than 0.77 g/cm³, less than 0.76 g/cm³, less than 0.75 g/cm³, less than 0.74 g/cm³, or less than 0.73 g/cm³.

The composite product can have an internal bond strength of about 0.1 MPa, about 0.2 MPa, about 0.3 MPa, about 0.35 MPa, about 0.4 MPa, about 0.5 MPa, about 0.6 MPa, about 0.7 MPA, about 0.8 MPa, about 0.9 MPa, about 1 MPa, or about 1.1 MPa to about 1.5 MPa, about 2 MPa, about 2.5 MPa, about 3 MPa, about 3.5 MPa, about 4 MPa, or about 5 MPa. For example, the composite product can have an internal bond strength of about 0.35 MPa to about 5.5 MPa, about 0.4 MPa to about 4.6 MPa, about 0.48 MPa to about 3.8 MPa, about 0.6 MPa to about 3.2 MPa, about 0.8 MPa to about 2.6 MPa, or about 0.5 MPa to about 2.1 MPa. In another example, the composite product can have an internal bond strength of about 0.5 MPa to about 2 MPa, about 0.6 MPa to about 1.6 MPa, about 1 MPa to about 1.7 MPa, about 0.6 MPa to about 1.2 MPa, or about 0.55 MPa to about 1.5 MPa. In some examples, the composite product can have an internal bond strength of at least 0.3 MPa, at least 0.33 MPa, at least 0.35 MPa, at least 0.38 MPa, at least 0.41 MPa, at least 0.45 MPa, at least 0.48 MPa, at least 0.51 MPa, at least 0.55 MPa, at least 0.58 MPa, at least 0.62 MPa, at least 0.65 MPa, at least 0.69 MPa, at least 0.72 MPa, at least 0.76 MPa, or at least 0.79 MPa. The internal bond strength for each example can be determined according to the test procedure provided for in ASTM D1037-06a.

In some examples, the composite product can have a density of less than 2 g/cm³, less than 1.9 g/cm³, less than 1.8 g/cm³, less than 1.7 g/cm³, less than 1.6 g/cm³, less than 1.5 g/cm³, less than 1.45 g/cm³, less than 1.4 g/cm³, less than 1.35 g/cm³, less than 1.3 g/cm³, less than 1.25 g/cm³, less than 1.2 g/cm³, less than 1.15 g/cm³, less than 1.1 g/cm³, less than 1.05 g/cm³, less than 1 g/cm³, less than 0.95 g/cm³, less than 0.9 g/cm³, less than 0.85 g/cm³, less than 0.8 g/cm³, less than 0.79 g/cm³, less than 0.78 g/cm³, less than 0.77 g/cm³, less than 0.76 g/cm³, less than 0.75 g/cm³, less than 0.74 g/cm³, or less than 0.73 g/cm³ and an internal bond strength of at least 0.3 MPa, at least 0.35 MPa, at least 0.4 MPa, at least 0.48 MPa, at least 0.51 MPa, at least 0.55 MPa, at least 0.58 MPa, at least 0.62 MPa, at least 0.65 MPa, or at least 0.69 MPa. In at least one specific example, the composite product can have a density less than 0.8 g/cm³ and internal bond strength of at least 0.48 MPa. In at least one other specific example, the composite product can have a density less than 0.8 g/cm³ and internal bond strength of at least 0.69 MPa. In at least one other specific example, the composite product can have a density of less than 0.73 g/cm³ and internal bond strength of at least 0.48 MPa. In still another example, the composite product can have a density of less than 0.73 g/cm³ and internal bond strength of at least 0.58 MPa.

Composite products such as particleboard, fiberboard, plywood, and oriented strand board, can have a thickness or average thickness of about 1.5 mm, about 5 mm, or about 10 mm to about 15 mm, about 20 mm, about 25 mm, about 30 mm, about 50 mm, about 100 mm, about 200 mm, or about 300 mm. Composite products such as particleboard, fiberboard, plywood, and oriented strand board can have a length of about 0.1 m, about 0.5 m, about 1 m, about 1.2 m, about 1.8 m, about 2.4 m, about 3 m, or about 3.6 m. The composite products can also have a width of about 0.1 m, about 0.5 m, about 1 m, about 1.2 m, about 1.8 m, about 2.4 m, or about 3 m.

The lignocellulose binder mixtures discussed and described herein can be free or essentially free of formaldehyde for use in the production of the composite products, e.g., wood products such as particleboard and plywood. As used herein, the term "essentially free of formaldehyde" means the lignocellulose binder mixture does not include or contain any intentionally added formaldehyde or compounds that can decompose, react, or otherwise form formaldehyde, such that the lignocellulose binder mixture does not contain formaldehyde or compounds that can form formaldehyde, but may include formaldehyde present as an impurity. Accordingly, depending on the particular multi-functional aldehydes used to produce the lignocellulose binder mixtures discussed and described herein, the lignocellulose binder mixture can be referred to as "no added formaldehyde" or "NAF" mixture.

The composite products discussed and described herein can exhibit a low level of formaldehyde emission. A suitable test for determining formaldehyde emission from a composite product can include ASTM D6007-02 and AST E1333-10. For example, the composite products can exhibit a formaldehyde emission of zero. In another example, the composite products can exhibit a formaldehyde emission of less than 1 part per million ("ppm"), such as about 0.9 ppm or less, about 0.08 ppm or less, about 0.07 ppm or less, about 0.06 ppm or less, about 0.05 ppm or less, about 0.04 ppm or less, about 0.03 ppm or less, about 0.02 ppm or less, about 0.01 ppm or less, or about 0.005 ppm or less.

The composite product can meet or exceed the formaldehyde emission standards required by the California Air Resources Board ("CARB") Phase 1 (less than 0.1 parts per million "ppm" formaldehyde for particleboard), and Phase 2 (less than 0.09 ppm formaldehyde for particleboard). The composite products discussed and described herein can also meet or exceed the formaldehyde emission standards required by the Japanese JIS/JAS F* (does not exceed 0.5 mg/L formaldehyde for particleboard), Japanese JIS/JAS F** (does not exceed 0.3 mg/L formaldehyde for particleboard), European E1, and European E2 standards.

In some examples, a method for making a composite product that can include combining at least the plurality of lignocellulose substrates, one or more complexed metal catalysts, one or more complexing agents, and one or more oxidants to produce the lignocellulose binder mixture, and then heating the lignocellulose binder mixture to produce a composite product. The lignocellulose binder mixture can have a molar ratio of the complexing agent to the complexed metal catalyst of about 0.1 or greater.

The lignocellulose binder mixture and/or the composite product can have a molar ratio of the complexing agent to the complexed metal catalyst of about 0.1 to about 2 or greater, about 0.2 to about 2, about 0.25 to about 1.5, about 0.30 to about 1.2, about 0.4 to about 1.1, or about 0.5 to about 1, or about 0.1 to about 1.5, or about 0.1 to about 1.2, or about 0.1 to about 1.1, or about 0.1 to about 1, or about 0.1 to about 0.9, or about 0.1 to about 0.8, or about 0.1 to about 0.7, or about 0.1 to about 0.5.

In some examples, the lignocellulose binder mixture can be heated to a temperature of at least 60° C. to about 300° C. for about 0.1 min to about 30 min to produce the composite product. In other example, the lignocellulose binder mixture can be heated to a temperature of at least 60° C. to about 300° C. for about 0.1 min to about 30 min, or a temperature of about 80° C. to about 250° C. for about 0.3 min to about 20 min, or a temperature of about 100° C. to about 200° C. for about 0.5 min to about 10 min, or a temperature of about 120° C. to about 180° C. for about 1 min to about 10 min, or a temperature of about 130° C. to about 170° C. for about 1 min to about 5 min; or a temperature of about 140° C. to about 160° C. for about 1 min to about 4 min.

In other examples, prior to heating the lignocellulose binder mixture, the method can include maintaining the lignocellulose binder mixture at a predetermined temperature for a predetermined amount of time. For example, the lignocellulose binder mixture can be maintained at a temperature of less than 60° C. for at least 10 min to about 240 min, or a temperature of less than 50° C. for at least 30 min to about 120 min, or a temperature of less than 40° C. for at least 30 min to about 90 min, or a temperature of less than 40° C. for at least 30 min to about 60 min, or at a temperature of less than 35° C. for at least 30 min to about 60 min.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Examples 1 and 2

Complexed Metal Catalyst with and without Excess Chelate (Comparison of Temperature)

In Examples 1 and 2, a plurality of lignocellulose substrates, such as face-grade particleboard wood particles of Southern Yellow Pine having a moisture content of about 2.5 wt % to about 3.0 wt %, in the amount of about 2,100 g, was placed in a mixer having a volume of about 0.0283 m³.

Example 1

Iron EDTA without Excess Chelate

While mixing, the following components of the binder system were applied in the form of a fine mist (e.g., sprayed onto the wood particles) in the following order and amounts: (a) about 6.14 wt % of ammonium lignosulfonate (about 46 wt % to about 49 wt % aqueous mixture) mixed with about 0.243 wt % of iron EDTA (about 15 wt % aqueous mixture); (b) about 4.86 wt % of the hydrogen peroxide (about 50 wt % aqueous mixture); and (c) about 0.5 wt % of emulsion wax (about 30 wt % aqueous mixture), where the amount of each component is based on the dry weight of the plurality of lignocellulose substrates or the wood particles.

Example 2

Iron EDTA with Excess Chelate (Tetrasodium EDTA)

While mixing, the following components of the binder system were applied in the form of a fine mist in the following order: (a) about 6.14 wt % of ammonium lignosulfonate (about 46 wt % to about 49 wt % aqueous mixture) mixed with about 0.243 wt % of iron EDTA (about 15 wt % aqueous mixture) and about 0.22 wt % of tetrasodium EDTA (about 39 wt % aqueous mixture); (b) about 4.86 wt % of the hydrogen peroxide (about 50 wt % aqueous mixture); and (c) about 0.5 wt % of emulsion wax (about 30 wt % aqueous mixture), where the amount of each component is based on the dry weight of the plurality of lignocellulose substrates or the wood particles.

The aqueous ammonium lignosulfonate was ARBO®A02L ammonium lignosulfonate, commercially available from Tembec. The iron EDTA was ferric sodium ethylenediaminetetraacetate trihydrate (98% purity), commercially available from Acros Organic. The wax emulsion was CHEMBEAD®30 wax emulsion (30% solid), commercially available from Altana (formerly ChemCor). Tetrasodium EDTA was Dissolvine E-39, commercially available from AkzoNobel.

For Examples 1 and 2, the lignocellulose binder mixture had a total moisture content of 15 wt % to 16 wt % and was blended for an additional 1 min. The lignocellulose binder mixture was placed in an 18.9 L heavy duty, thermally insulating beverage cooler (45 cm high, 25 cm internal diameter) and the temperature of exothermic reaction was monitored by thermocouple placed in the center of the lignocellulose binder mixture. The beverage cooler was closed to assure adiabatic conditions. Table 1 (below) shows the temperature in the center of the lignocellulose binder mixture relative to time starting at 2 min after the emulsion wax was added in Examples 1 and 2.

TABLE 1

| Time (min) | Exp. 1 Temp. (° C.) | Exp. 2 Temp. (° C.) |
| --- | --- | --- |
| 2 | 21.5 | 22.3 |
| 3 | 23.3 | 22.6 |
| 4 | 24 | 22.8 |
| 5 | 24.6 | 23 |
| 6 | 25 | 23.2 |
| 7 | 25.3 | 23.5 |
| 8 | 25.7 | 23.6 |
| 9 | 26 | 23.9 |
| 10 | 26.3 | 24.5 |
| 11 | 26.6 | 24.4 |
| 12 | 26.8 | 24.3 |
| 13 | 27.1 | 24.5 |
| 14 | 27.3 | 24.7 |
| 15 | 27.6 | 24.9 |
| 16 | 27.9 | 25 |
| 17 | 28.2 | 25.2 |
| 18 | 28.4 | 25.3 |
| 19 | 28.7 | 25.5 |
| 20 | 29 | 25.6 |
| 21 | 29.2 | 25.8 |
| 22 | 29.5 | 26 |
| 23 | 29.8 | 26.1 |
| 24 | 30.1 | 26.3 |
| 25 | 30.3 | 26.4 |
| 26 | 30.6 | 26.6 |
| 27 | 30.9 | 26.8 |
| 28 | 31.2 | 26.9 |
| 29 | 31.5 | 27 |

TABLE 1-continued

| Time (min) | Exp. 1 Temp. (° C.) | Exp. 2 Temp. (° C.) |
|---|---|---|
| 30 | 31.8 | 27.2 |
| 31 | 32.1 | 27.3 |
| 32 | 32.5 | 27.5 |
| 33 | 32.8 | 27.6 |
| 34 | 33 | 27.8 |
| 35 | 33.4 | 27.9 |
| 36 | 33.8 | 28.1 |
| 37 | 34.1 | 28.2 |
| 38 | 34.4 | 28.4 |
| 39 | 34.8 | 28.5 |
| 40 | 35.2 | 28.7 |
| 41 | 35.5 | 28.9 |
| 42 | 35.9 | 29 |
| 43 | 36.3 | 29.2 |
| 44 | 36.7 | 29.3 |
| 45 | 37 | 29.5 |
| 46 | 37.5 | 29.6 |
| 47 | 37.9 | 29.8 |
| 48 | 38.3 | 29.9 |
| 49 | 38.8 | 30 |
| 50 | 39.2 | 30.2 |
| 51 | 39.7 | 30.3 |
| 52 | 40.2 | 30.5 |
| 53 | 40.7 | 30.6 |
| 54 | 41.2 | 30.8 |
| 55 | 41.8 | 30.9 |
| 56 | 42.3 | 31.1 |
| 57 | 42.9 | 31.2 |
| 58 | 43.6 | 31.4 |
| 59 | 44.2 | 31.6 |
| 60 | 45 | 31.7 |
| 61 | 45.7 | 31.9 |
| 62 | 46.6 | 32 |
| 63 | 47.5 | 32.2 |
| 64 | 48.5 | 32.3 |
| 65 | 49.5 | 32.5 |
| 66 | 50.8 | 32.6 |
| 67 | 52.4 | 32.8 |
| 68 | 54.6 | 33 |
| 69 | 84.1 | 33.2 |
| 70 | — | 33.3 |
| 71 | — | 33.5 |
| 72 | — | 33.7 |
| 73 | — | 33.8 |
| 74 | — | 34 |
| 75 | — | 34.2 |
| 76 | — | 34.3 |
| 77 | — | 34.5 |
| 78 | — | 34.7 |
| 79 | — | 34.9 |
| 80 | — | 35.1 |
| 81 | — | 35.3 |
| 82 | — | 35.5 |
| 83 | — | 35.7 |
| 84 | — | 35.9 |
| 85 | — | 36.1 |

Examples 3 and 4

Preparation of Particleboard Panels

Examples 3 and 4 used the lignocellulose binder mixture or mixtures, as prepared above in Examples 1 and 2, respectively. Instead of placing the lignocellulose binder mixture into the thermally insulating beverage cooler and measuring the temperature of the center of the lignocellulose binder mixture, the lignocellulose binder mixture (moisture content about 12% to about 17%) was blended for an additional amount of time of about 2 min. After this time, a mat was prepared from each of the lignocellulose binder mixtures, each mat had the dimensions of about 40.64 cm×about 40.64 cm×about 5.08 cm.

Example 3

The mat, prepared from the lignocellulose binder mixture, as prepared in Example 1, was pressed for about 2.5 min at about 149° C. (total press time of about 2.5 min included about 0.5 min closing time, about 1.5 min press time at about 1.24 MPa, and about 0.5 min degas time). The produce product yielded a panel of about 40.64 cm×about 40.64 cm having thickness of about 1.58±0.2 cm. Final particleboard composites were cooled to room temperature (e.g., about 25° C.) and the internal bond strength was measured at about 0.46 MPa.

Example 4

The mat, prepared from the lignocellulose binder mixture, as prepared in Example 2, was pressed for about 2.5 min at about 149° C. (total press time of about 2.5 min included about 0.5 min closing time, about 1.5 min press time at about 5.65 MPa, and about 0.5 min degas time). The produce product yielded a panel of about 40.64 cm×about 40.64 cm having thickness of about 1.58±0.2 cm. Final particleboard composites were cooled to room temperature (e.g., about 25° C.) and the internal bond strength was measured at about 0.36 MPa.

Embodiments of the present disclosure further relate to any one or more of the following paragraphs:

1. A method for making a composite product, comprising: combining a plurality of lignocellulose substrates, a complexed metal catalyst, a complexing agent, and an oxidant to produce a lignocellulose binder mixture, wherein the lignocellulose binder mixture has a molar ratio of the complexing agent to the complexed metal catalyst of about 0.1 or greater; and heating the lignocellulose binder mixture to produce a composite product.

2. The method according to paragraph 1, wherein the molar ratio of the complexing agent to the complexed metal catalyst is about 0.1 to about 2.

3. The method according to paragraph 1 or 2, further comprising maintaining the lignocellulose binder mixture at a temperature of less than 60° C. for at least 10 min before heating the lignocellulose binder mixture.

4. The method according to any one of paragraphs 1 to 3, wherein the lignocellulose binder mixture is heated to a temperature of at least 60° C. to about 300° C. for about 0.1 min to about 30 min to produce the composite product.

5. The method according to any one of paragraphs 1 to 4, further comprising pressing the lignocellulose binder mixture when the lignocellulose binder mixture is heated to produce the composite product, wherein the lignocellulose binder mixture is pressed to a pressure of about 0.5 MPa to about 15 MPa.

6. The method according to any one of paragraphs 1 to 5, wherein the complexed metal catalyst and the complexing agent each comprise the same chelate compound.

7. The method according to any one of paragraphs 1 to 6, wherein the complexed metal catalyst and the complexing agent each comprise ethylenediaminetetraacetate.

8. The method according to any one of paragraphs 1 to 6, wherein the complexing agent comprises ethylenediaminetetraacetate (EDTA), ethylenediamine-N,N'-disuccinate (EDDS), ethyleneglycol-bis(2-aminoethyl)-N,N,N',N'-tetraacetate (EGTA), diethylenetriaminepentaacetate (DTPA), trans-1,2-diaminocyclohexane tetraacetate (CDTA), iminodisuccinate (IDS), nitrilotriacetate (NTA), cyanide, sulfate, salts thereof, acids thereof, hydrates thereof, or any mixture thereof.

9. The method according to any one of paragraphs 1 to 8, wherein the lignocellulose binder mixture comprises the complexing agent in an amount of about 0.005 wt % to about 5 wt %, based on a dry weight of the plurality of lignocellulose substrates.

10. The method according to any one of paragraphs 1 to 9, wherein the complexed metal catalyst comprises one or more of iron, copper, manganese, tungsten, or molybdenum.

11. The method according to any one of paragraphs 1 to 10, wherein the complexed metal catalyst comprises iron and the oxidant comprises hydrogen peroxide.

12. The method according to any one of paragraphs 1 to 6, 9, and 11, wherein the complexed metal catalyst comprises iron ethylenediaminetetraacetate, iron (S,S)-ethylenediamine-N,N'-disuccinate, iron diethylenetriamine pentaacetate, iron ethlyleneglycol-bis(2-aminoethyl)-N,N,N',N'-tetraacetate, iron trans-1,2-diaminocyclohexanetetraacetate, potassium ferricyanide, salts thereof, acids thereof, hydrates thereof, or any mixture thereof.

13. The method according to any one of paragraphs 1 to 12, wherein the lignocellulose binder mixture comprises the complexed metal catalyst in an amount of about 0.05 wt % to about 5 wt %, based on a dry weight of the plurality of lignocellulose substrates.

14. The method according to any one of paragraphs 1 to 13, wherein the lignocellulose binder mixture further comprises a polyphenolic material, wherein the polyphenolic material comprises lignins, lignosulfonates, modified lignins, tannins, novolac resins, modified phenol formaldehyde resins, bisphenol A, humic acids, salts thereof, acids thereof, hydrates thereof, or any mixture thereof, and wherein the lignocellulose binder mixture comprises the polyphenolic material in an amount of about 0.5 wt % to about 10 wt %, based on a dry weight of the plurality of lignocellulose substrates.

15. The method according to any one of paragraphs 1 to 14, wherein the lignocellulose binder mixture further comprises a lignin compound, and wherein the lignin compound comprises ammonium lignosulfonate, sodium lignosulfonate, calcium lignosulfonate, potassium lignosulfonate, magnesium lignosulfonate, cesium lignosulfonate, modified lignins, salts thereof, acids thereof, hydrates thereof, or any mixture thereof.

16. The method according to any one of paragraphs 1 to 14, wherein the lignocellulose binder mixture further comprises an unsaturated compound, and wherein the unsaturated compound comprises dicyclopentadiene, ethylene glycol diacrylate, ethylene glycol dimethacrylate, diethylene glycol diacrylate, diethylene glycol dimethacrylate, poly(ethylene glycol)diacrylate, poly(ethylene glycol)dimethacrylate, trimethylolpropane triacrylate, pentaerythritol tetraacrylate, pentaerythritol triacrylate, polyacrylate starch, linseed oil, an unsaturated prepolymer, or any mixture thereof.

17. The method according to any one of paragraphs 1 to 16, wherein the composite product has a density of less than 1.5 g/cm$^3$ and an internal bond strength of at least 0.35 MPa.

18. The method according to any one of paragraphs 1 to 17, wherein the composite product comprises the plurality of lignocellulose substrates, the complexed metal catalyst, the complexing agent, a polyphenolic material, and an emulsion wax.

19. A method for making a composite product, comprising: combining a plurality of lignocellulose substrates, a complexed metal catalyst, a complexing agent, a polyphenolic material, and an oxidant to produce a lignocellulose binder mixture, wherein the lignocellulose binder mixture has a molar ratio of the complexing agent to the complexed metal catalyst of about 0.1 or greater; maintaining the lignocellulose binder mixture at a temperature of less than 60° C. for at least 10 min; and then heating the lignocellulose binder mixture to a temperature of at least 60° C. to produce a composite product.

20. A composite product, comprising an at least partially cured lignocellulose binder mixture, wherein the lignocellulose binder mixture, prior to curing, comprises a plurality of lignocellulose substrates, a polyphenolic material, a complexed metal catalyst, a complexing agent, and an oxidant, and wherein the lignocellulose binder mixture has a molar ratio of the complexing agent to the complexed metal catalyst of about 0.1 or greater.

21. A method for making a composite product, comprising: combining a plurality of lignocellulose substrates, a complexed metal catalyst comprising iron ethylenediaminetetraacetate, a complexing agent comprising an metal alkali ethylenediaminetetraacetate, an alkaline earth metal ethylenediaminetetraacetate, acids thereof, salts thereof, hydrates thereof, or mixtures thereof, and an oxidant to produce a lignocellulose binder mixture, wherein the lignocellulose binder mixture has a molar ratio of the complexing agent to the complexed metal catalyst of about 0.1 or greater; maintaining the lignocellulose binder mixture at a temperature of less than 60° C. for at least 10 min; and then heating the lignocellulose binder mixture to a temperature of at least 60° C. to produce a composite product.

22. A method for making a composite product, comprising: combining a plurality of lignocellulose substrates, a complexed metal catalyst comprising iron ethylenediaminetetraacetate, a complexing agent comprising an metal alkali ethylenediaminetetraacetate, an alkaline earth metal ethylenediaminetetraacetate, acids thereof, salts thereof, hydrates thereof, or mixtures thereof, and an oxidant to produce a lignocellulose binder mixture, wherein the lignocellulose binder mixture has a molar ratio of the complexing agent to the complexed metal catalyst of about 0.1 to about 2; maintaining the lignocellulose binder mixture at a temperature of less than 60° C. for at least 10 min; and then heating the lignocellulose binder mixture to a temperature of at least 60° C. to produce a composite product.

23. A method for making a composite product, comprising: combining a plurality of lignocellulose substrates, a complexed metal catalyst comprising iron ethylenediaminetetraacetate, a complexing agent comprising an metal alkali ethylenediaminetetraacetate, an alkaline earth metal ethylenediaminetetraacetate, acids thereof, salts thereof, hydrates thereof, or mixtures thereof, a polyphenolic material, and an oxidant to produce a lignocellulose binder mixture, wherein the lignocellulose binder mixture has a molar ratio of the complexing agent to the complexed metal catalyst of about 0.1 to about 2; maintaining the lignocellulose binder mixture at a temperature of less than 60° C. for at least 10 min; and then heating the lignocellulose binder mixture to a temperature of at least 60° C. to produce a composite product.

24. A method for making a composite product, comprising: combining a plurality of lignocellulose substrates, a complexed metal catalyst comprising iron ethylenediaminetetraacetate, a complexing agent comprising an metal alkali ethylenediaminetetraacetate, an alkaline earth metal ethylenediaminetetraacetate, acids thereof, salts thereof, hydrates thereof, or mixtures thereof, a polyphenolic material, a wax, and an oxidant to produce a lignocellulose binder mixture, wherein the lignocellulose binder mixture has a molar ratio of the complexing agent to the complexed metal catalyst of about 0.1 to about 2; maintaining the lignocellulose binder mixture at a temperature of less than 60° C. for at least 10 min; and then heating the lignocellulose binder mixture to a temperature of at least 60° C. to produce a composite product.

25. A method for making a composite product, comprising: combining a plurality of lignocellulose substrates, a complexed metal catalyst comprising a complexed iron catalyst, a complexing agent, and an oxidant to produce a lignocellulose binder mixture, wherein the lignocellulose binder mixture has a molar ratio of the complexing agent to the complexed metal catalyst of about 0.1, and wherein the complexed metal catalyst and the complexing agent each comprise the same chelate compound; maintaining the lignocellulose binder mixture at a temperature of less than 60° C. for at least 10 min; and then heating the lignocellulose binder mixture to a temperature of at least 60° C. to produce a composite product.

26. A method for making a composite product, comprising: combining a plurality of lignocellulose substrates, a complexed metal catalyst comprising a complexed iron catalyst, a complexing agent, and an oxidant to produce a lignocellulose binder mixture, wherein the lignocellulose binder mixture has a molar ratio of the complexing agent to the complexed metal catalyst of about 0.1, and wherein the complexed metal catalyst and the complexing agent each comprise ethylenediaminetetraacetate; maintaining the lignocellulose binder mixture at a temperature of less than 60° C. for at least 10 min; and subsequently heating the lignocellulose binder mixture to a temperature of at least 60° C. to produce a composite product.

27. A composite product made by the method according to any one of paragraphs 1 to 19 and 21 to 26.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. And if applicable, all patents, test procedures, and other documents cited in this application are fully incorporated by reference to the extent such disclosure is not inconsistent with this application and for all jurisdictions in which such incorporation is permitted.

While the foregoing is directed to certain illustrative embodiments, other and further embodiments of the invention can be devised without departing from the basic scope thereof, and the scope thereof is determined by the claims that follow.

What is claimed is:

1. A method for making a composite product, comprising: combining a plurality of lignocellulose substrates, a complexed metal catalyst, a complexing agent, and an oxidant to produce a lignocellulose binder mixture, wherein the lignocellulose binder mixture has a molar ratio of the complexing agent to the complexed metal catalyst of about 0.1 or greater; and heating the lignocellulose binder mixture to produce the composite product.

2. The method of claim 1, wherein the molar ratio of the complexing agent to the complexed metal catalyst is about 0.1 to about 2.

3. The method of claim 1, further comprising maintaining the lignocellulose binder mixture at a temperature of less than 60° C. for at least 10 min before heating the lignocellulose binder mixture.

4. The method of claim 1, wherein the lignocellulose binder mixture is heated to a temperature of at least 60° C. to about 300° C. for about 0.1 min to about 30 min to produce the composite product.

5. The method of claim 1, further comprising pressing the lignocellulose binder mixture when the lignocellulose binder mixture is heated to produce the composite product, wherein the lignocellulose binder mixture is pressed to a pressure of about 0.5 MPa to about 15 MPa.

6. The method of claim 1, wherein the complexed metal catalyst comprises a first chelate compound and the complexing agent comprises a second chelate compound, and wherein the first chelate compound and the second chelate compound are the same compound.

7. The method of claim 1, wherein the complexed metal catalyst and the complexing agent each comprise ethylenediaminetetraacetate.

8. The method of claim 1, wherein the complexing agent comprises ethylenediaminetetraacetate (EDTA), ethylenediamine-N,N'-disuccinate (EDDS), ethyleneglycol-bis(2-aminoethyl)-N,N,N',N'-tetraacetate (EGTA), diethylenetriaminepentaacetate (DTPA), trans-1,2-diaminocyclohexane tetraacetate (CDTA), iminodisuccinate (IDS), nitrilotriacetate (NTA), cyanide, sulfate, salts thereof, acids thereof, hydrates thereof, or any mixture thereof.

9. The method of claim 1, wherein the lignocellulose binder mixture comprises the complexing agent in an amount of about 0.005 wt % to about 5 wt %, based on a dry weight of the plurality of lignocellulose substrates.

10. The method of claim 1, wherein the complexed metal catalyst comprises one or more of iron, copper, manganese, tungsten, or molybdenum.

11. The method of claim 1, wherein the complexed metal catalyst comprises iron and the oxidant comprises hydrogen peroxide.

12. The method of claim 1, wherein the complexed metal catalyst comprises iron ethylenediaminetetraacetate, iron (S,S)-ethylenediamine-N,N'-disuccinate, iron diethylenetriamine pentaacetate, iron ethlyleneglycol-bis(2-aminoethyl)-N,N,N',N'-tetraacetate, iron trans-1,2-diaminocyclohexanetetraacetate, potassium ferricyanide, salts thereof, acids thereof, hydrates thereof, or any mixture thereof.

13. The method of claim 1, wherein the lignocellulose binder mixture comprises the complexed metal catalyst in an amount of about 0.05 wt % to about 5 wt %, based on a dry weight of the plurality of lignocellulose substrates.

14. The method of claim 1, wherein the lignocellulose binder mixture further comprises a polyphenolic material, wherein the polyphenolic material comprises lignins, lignosulfonates, modified lignins, tannins, novolac resins, modified phenol formaldehyde resins, bisphenol A, humic acids, salts thereof, acids thereof, hydrates thereof, or any mixture thereof, and wherein the lignocellulose binder mixture comprises the polyphenolic material in an amount of about 0.5 wt % to about 10 wt %, based on a dry weight of the plurality of lignocellulose substrates.

15. The method of claim 1, wherein the lignocellulose binder mixture further comprises a lignin compound, and wherein the lignin compound comprises ammonium lignosulfonate, sodium lignosulfonate, calcium lignosulfonate, potassium lignosulfonate, magnesium lignosulfonate, cesium lignosulfonate, modified lignins, salts thereof, acids thereof, hydrates thereof, or any mixture thereof.

16. The method of claim 1, wherein the lignocellulose binder mixture further comprises an unsaturated compound, and wherein the unsaturated compound comprises dicyclopentadiene, ethylene glycol diacrylate, ethylene glycol dimethacrylate, diethylene glycol diacrylate, diethylene glycol dimethacrylate, poly(ethylene glycol) diacrylate, poly(ethylene glycol) dimethacrylate, trimethylolpropane triacrylate, pentaerythritol tetraacrylate, pentaerythritol triacrylate, polyacrylate starch, linseed oil, an unsaturated prepolymer, or any mixture thereof.

17. The method of claim 1, wherein the composite product has a density of less than 1.5 g/cm³ and an internal bond strength of at least 0.35 MPa.

18. The method of claim 1, wherein the composite product comprises the plurality of lignocellulose substrates, the complexed metal catalyst, the complexing agent, a polyphenolic material, and an emulsion wax.

19. A method for making a composite product, comprising:
combining a plurality of lignocellulose substrates, a complexed metal catalyst, a complexing agent, a polyphenolic material, and an oxidant to produce a lignocellulose binder mixture, wherein the lignocellulose binder mixture has a molar ratio of the complexing agent to the complexed metal catalyst of about 0.1 or greater;
maintaining the lignocellulose binder mixture at a temperature of less than 60° C. for at least 10 min; and subsequently
heating the lignocellulose binder mixture to a temperature of at least 60° C. to produce the composite product.

20. A method for making a composite product, comprising:
combining a plurality of lignocellulose substrates, a complexed metal catalyst, a complexing agent, an unsaturated compound, and an oxidant to produce a lignocellulose binder mixture, wherein the lignocellulose is a material that includes lignin and cellulose, hemicellulose, or a combination of cellulose and hemicelluloses, and wherein the lignocellulose binder mixture has a molar ratio of the complexing agent to the complexed metal catalyst of about 0.1 or greater, and wherein the unsaturated compound comprises dicyclopentadiene, ethylene glycol diacrylate, ethylene glycol dimethacrylate, diethylene glycol diacrylate, diethylene glycol dimethacrylate, poly(ethylene glycol)diacrylate, poly(ethylene glycol)dimethacrylate, trimethylolpropane triacrylate, pentaerythritol tetraacrylate, pentaerythritol triacrylate, an unsaturated polyester prepolymer, an unsaturated polyether prepolymer, an unsaturated polyamide prepolymer, an unsaturated polyurethane prepolymer, or any mixture thereof; and
heating the lignocellulose binder mixture to produce the composite product.

* * * * *